(12) United States Patent (10) Patent No.: US 7,031,404 B2
Lindquist (45) Date of Patent: Apr. 18, 2006

(54) INVERSE DWT METHOD AND APPARATUS

(75) Inventor: Timothy John Lindquist, Thornleigh (AU)

(73) Assignee: Canon Kabushiki Kaisha, Tokyo (JP)

( * ) Notice: Subject to any disclaimer, the term of this patent is extended or adjusted under 35 U.S.C. 154(b) by 764 days.

(21) Appl. No.: 09/730,558

(22) Filed: Dec. 7, 2000

(65) Prior Publication Data

US 2001/0014118 A1 Aug. 16, 2001

(30) Foreign Application Priority Data

Dec. 10, 1999 (AU) .................................. PQ4572

(51) Int. Cl.
*H03K 9/00* (2006.01)
*G06K 9/36* (2006.01)
*H04N 7/12* (2006.01)

(52) U.S. Cl. ...................... 375/316; 382/233; 382/240; 375/240.1

(58) Field of Classification Search ................ 375/316, 375/240, 240.19, 254; 382/254, 232–240; 708/400
See application file for complete search history.

(56) References Cited

U.S. PATENT DOCUMENTS

| | | | | |
|---|---|---|---|---|
| 5,321,776 A | * | 6/1994 | Shapiro | 382/240 |
| 6,124,811 A | * | 9/2000 | Acharya et al. | 341/63 |
| 6,154,493 A | * | 11/2000 | Acharya et al. | 375/240.19 |
| 6,389,176 B1 | * | 5/2002 | Hsu et al. | 382/254 |
| 6,456,657 B1 | * | 9/2002 | Yeap et al. | 375/240.12 |
| 6,539,412 B1 | * | 3/2003 | Kim et al. | 708/400 |
| 6,628,716 B1 | * | 9/2003 | Tan et al. | 375/240.19 |

FOREIGN PATENT DOCUMENTS

AU 744914 1/2001
AU 748978 6/2001

OTHER PUBLICATIONS

Herley, C.; Vetterli, M.; Circuits and Systems, 1993., ISCAS '93, 1993 IEEE International Symposium on , May 3-6, 1993 □□pp.:391-394.*

* cited by examiner

*Primary Examiner*—Stephen Chin
*Assistant Examiner*—Cicely Ware
(74) *Attorney, Agent, or Firm*—Fitzpatrick, Cella, Harper & Scinto

(57) ABSTRACT

A method for performing an Inverse Discrete Wavelet Transform is disclosed. The method comprises inverse transforming, using filters (706–710) having specified filter widths, data from associated sub-bands in a first sub-band level, to form processed data in a corresponding sub-band in the second sub-band level. The method further inverse transforms, in a pipeline fashion, using second filters (712–716) having the same corresponding associated filter widths, the processed data in conjunction with corresponding data from associated sub-bands in the second sub-band level.

18 Claims, 23 Drawing Sheets

INVERSE DWT METHOD AND APPARATUS

TECHNICAL FIELD OF THE INVENTION

The present invention relates generally to the field of inverse transforms, and in particular, to inverse discrete wavelet transforms (IDWTs).

BACKGROUND ART

Typically, data compression using wavelet techniques is a two step process, comprising a transform phase, during which the wavelet transform of the data set is calculated, and a subsequent coding stage, during which the resultant set from the transform operation is separated into segments, which are then coded using a specific coder In regard to decompression, the reverse occurs, with coded blocks first being decoded, and subsequently, the inverse wavelet transform being applied in order to generate the final decompressed output.

The inverse discrete wavelet transform (IDWT) is a computationally intensive operation, and current implementations use large memory stores in order to store intermediate results generated during the inverse operations. This intermediate data is generated, and read in an iterative process, as the IDWT process is performed.

DISCLOSURE OF THE INVENTION

The present invention is an alternate method of performing the computational process required to process multiple levels of DWT data, in order to produce decompressed output data in scanline, or band order, with reduced intermediate memory requirement.

According to a first aspect of the invention, there is provided a method for performing an Inverse Discrete Wavelet Transform (IDWT) comprising, for a first sub-band level and a second sub-band level in an N level Discrete Wavelet Transform, the steps of:

(i) inverse transforming, using filters having associated filter widths, data from associated sub-bands in the first sub-band level, to form processed data in a corresponding sub-band in the second sub-band level; and (ii) inverse transforming, using second filters having the same corresponding associated filter widths, the processed data in conjunction with corresponding data from associated sub-bands in the second sub-band level; wherein steps (i) and (ii) are performed in a pipeline manner.

According to another aspect of the invention, there is provided a method for performing an IDWT in relation to an N level Discrete Wavelet Transform, said method comprising steps of:

(i) applying a first set of M×M filters to data from associated sub-bands In a first sub-band level, thereby to form M×M processed data points in a corresponding sub-band in a second sub-band level;

(ii) applying, in a pipeline manner in respect to N−1 succeeding sub-band levels, N−1 corresponding sets of M×M filters, each corresponding set being applied to M×M processed data points from a preceding level in conjunction with corresponding data from associated sub-bands in the succeeding sub-band level; thereby to form, in a pipeline manner, a set of M×M output data points.

According to another aspect of the invention, there is provided an apparatus adapted for performing an Inverse Discrete Wavelet Transform (IDWT) comprising, for a first sub-band level and a second sub-band level in an N level Discrete Wavelet Transform:

filters having associated filter widths, for inverse transforming data from associated sub-bands in the first sub-band level thereby to form processed data in a corresponding sub-band in the second sub-band level; and second filters having the same corresponding associated filter widths, for inverse transforming the processed data in conjunction with corresponding data from associated sub-bands in the second sub-band level; wherein the filters and the second filters are arranged in a pipeline manner.

According to another aspect of the invention, there is provided an apparatus adapted for performing an IDWT in relation to an N level Discrete Wavelet Transform, said apparatus comprising:

a first set of M×M filters for applying to data from associated sub-bands in a first sub-band level, thereby to form M×M processed data points in a corresponding sub-band in a second sub-band level;

N−1 corresponding sets of M×M filters, for applying, in a pipeline manner in respect to N−1 succeeding sub-band levels, each corresponding set being applied to M×M processed data points from a preceding level in conjunction with corresponding data from associated sub-bands in the succeeding sub-band level; thereby to form, in a pipeline manner, a set of M×M output data points.

According to another aspect of the invention, there is provided a computer readable memory medium for storing a program for apparatus which performs an Inverse Discrete Wavelet Transform (IDWT), said program comprising, for a first sub-band level and a second sub-band level in an N level Discrete Wavelet Transform:

code for a first inverse transforming step for inverse transforming, using filters having associated filter widths, data from associated sub-bands in the first sub-band level, to form processed data in a corresponding sub-band in the second sub-band level; and code for a second inverse transforming step for inverse transforming, using second filters having the same corresponding associated filter widths, the processed data in conjunction with corresponding data from associated sub-bands in the second sub-band level; wherein the code for the first inverse transforming step and the code for the second inverse transforming step are executed in a pipeline manner.

According to another aspect of the invention, there is provided a computer readable memory medium for storing a program for apparatus which performs an IDWT, said program comprising:

(i) first code for an applying step, for applying a first set of M×M filters to data from associated sub-bands in a first sub-band level, thereby to form M×M processed data points in a corresponding sub-band in a second sub-band level;

(ii) second code for an applying step, for applying, in a pipeline manner in respect to N−1 succeeding sub-band levels, N−1 corresponding sets of M×M filters, each corresponding set being applied to M×M processed data points from a preceding level in conjunction with corresponding data from associated sub-bands in the succeeding sub-band level; thereby to form, in a pipeline manner, a set of M×M output data points.

According to another aspect of the invention, there is provided a method for performing an IDWT in relation to an N level Discrete Wavelet Transform, said method comprising, for first sets of data points from associated sub-bands of a first sub-band level, and a second set of data points from a second sub-band level, said first set and said second set of data points each having first data dimensions, steps of:

(i) inverse transforming, using a first computational block having said first data dimensions, said first sets of data points to form a set of processed data points in a corresponding sub-band in the second sub-band level, said set of processed data points having said first data dimensions, and (ii) inverse transforming, using a second computational block having said first data dimensions, the set of processed data points in conjunction with a corresponding set of data points from associated sub-bands in the second sub-band level; wherein steps (i) and (ii) are performed in a pipeline manner thereby to form a set of output data points having said first data dimensions.

According to another aspect of the invention, there is provided an apparatus for performing an IDWT in relation to an N level DWT, said apparatus comprising, in respect to a current sub-band level and a subsequent sub-band level;

a first plurality of parallel convolvers each having a plurality of output data channels, and each said parallel convolver receiving data from a corresponding subband at said current sub-band level;

a second plurality of serial convolvers each receiving data from corresponding ones of said output data channels and producing data for a low-low frequency sub-band of the subsequent sub-band level.

According to another aspect of the invention, there is provided a method for performing an IDWT in relation to an N level DWT, said method comprising, in respect to a current sub-band level and a subsequent sub-band level, steps of:

providing data from corresponding subbands at said current sub-band level to a first plurality of parallel convolvers, each said parallel convolver having a plurality of output data channels;

providing data from corresponding ones of said output data channels to a second plurality of serial convolvers, each said second plurality of serial convolvers producing data for a low-low frequency sub-band of the subsequent sub-band level.

BRIEF DESCRIPTION OF THE DRAWINGS

A number of preferred embodiments of the present invention will now be described, with reference to the drawings, in which.

DETAILED DESCRIPTION INCLUDING BEST MODE

Figure 1:
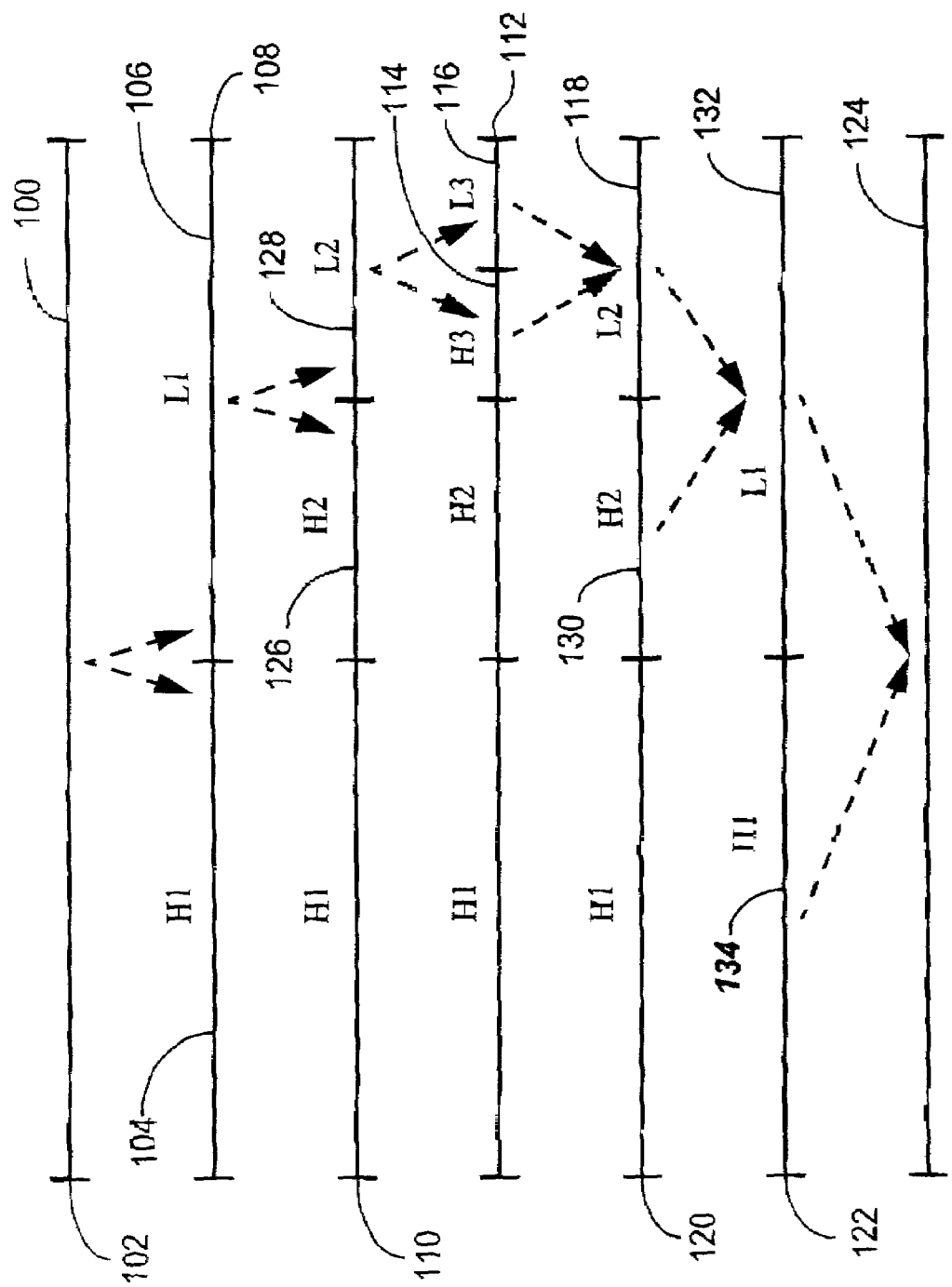
FIG. 1 is a representation of a three level DWT/IDWT process performed on a one-dimensional data set.

Where reference is made in any one or more of the accompanying drawings to steps and/or features, which have the same reference numerals, those steps and/or features have for the purposes of this description the same function(s) or operation(s), unless the contrary intention appears.

The principles of the preferred method described herein have general applicability to inverse discrete wavelet transforms in any number of dimensions For ease of explanation however, the steps of the preferred method are described primarily with reference to one-dimensional and two-dimensional data sets. It is not, however, intended that the present invention be limited thereto.

FIG. 1 illustrates a three level, forward and reverse, discrete wavelet transform process, in regard to a one-dimensional data set 100. The data set 100 is designated as being at the "zero" level, this being depicted by the numeral 102. The first level transformed data is similarly depicted by the numeral 108, with the second and third level transformed data being depicted by the numerals 110 and 112 respectively. In the inverse transform direction, the third level data 112 is inverse transformed to form second level data 120, thereafter being inverse transformed to form first level data 122, and finally being inverse transformed to reconstitute the original data 124 at the zero level. In the forward transform direction, the data set 100 is transformed to form two first level sub-bands 104 and 106, one of which, ie. 106, being further transformed to form two second-level sub-bands 126 and 128. Sub-band 128 is yet further transformed to form sub-bands 114 and 116, this representing a third level of transformation. In the inverse transform direction, the third-level sub-bands 114, 116 are inverse transformed to produce a second-level sub-band 118, which, together with a sub-band 130 presently being held in memory, are inverse transformed to a first-level sub-band 132. In the inverse IDWT process, the H sub-bands are typically stored in a buffer memory, as can be seen at the third data level 112 where H1, H2 and H3 are seen to be available. Since the forward DWT process formed all the H sub-bands, these are, of necessity, held in buffer storage. However, in the IDWT direction, the need to hold a particular L sub-band in intermediate storage until the next stage of the IDWT process takes place, is undesirable. It is the production of the intermediate L sub-bands which requires the intermediate memory during IDWT computation. Thus, for example, H3 and L3 (ie 114 and 116 respectively) produce L2 (ie 118), and L2 must be held (ie stored) in intermediate storage to be processed with H2 (ie 130) in order to produce L1 (ie 132). Finally, the aforementioned sub-band 132 is inverse transformed together with a sub-band 134, presently held in memory, to re-constitute, either exactly or approximately, the original data 124.

Existing approaches process DWTs one level at a time, writing intermediate results to memory The same comment applies equally to the IDWT process. For example, when performing the inverse transform from the second level 120 to the first level 122, the sub-band 118, held in intermediate memory, is inverse transformed together with the sub-band 130, the latter being held in buffer memory. Similarly, in proceeding from the first sub-band level to the zeroth sub-band level, the sub-band 132, also held in intermediate memory, is inverse transformed together with the sub-band 134, the latter being held in buffer memory. The same comments in regard to H sub-bands being available, while L sub-bands require intermediate memory applies as was noted previously.

Considering the IDWT process, since data is up-sampled in each successive IDWT level, the amount of intermediate memory required increases with each level. The memory required for sub-bands 114 and 116 at the third level 112 can be intuitively related to the lengths of the line segments used to represent the sub-bands. It is seen that at the next (ie. second) level 120, the line segment representing the sub-band 130 presently held in storage is twice as long as each line segment representing the sub-bands 114, 116, indicating that the memory storage requirements at the sub-band level 120 are twice as high on a per sub-band basis, as at the previous (ie. third) sub-band level 112. At each level, sufficient memory must be available to store the outputs associated with that level, noting that the memory requirements double (for the one-dimensional case) on a per level basis as the process progresses through the levels. In the two-dimensional case, memory requirements quadruple on a per-level basis, and so on.

Figure 2:
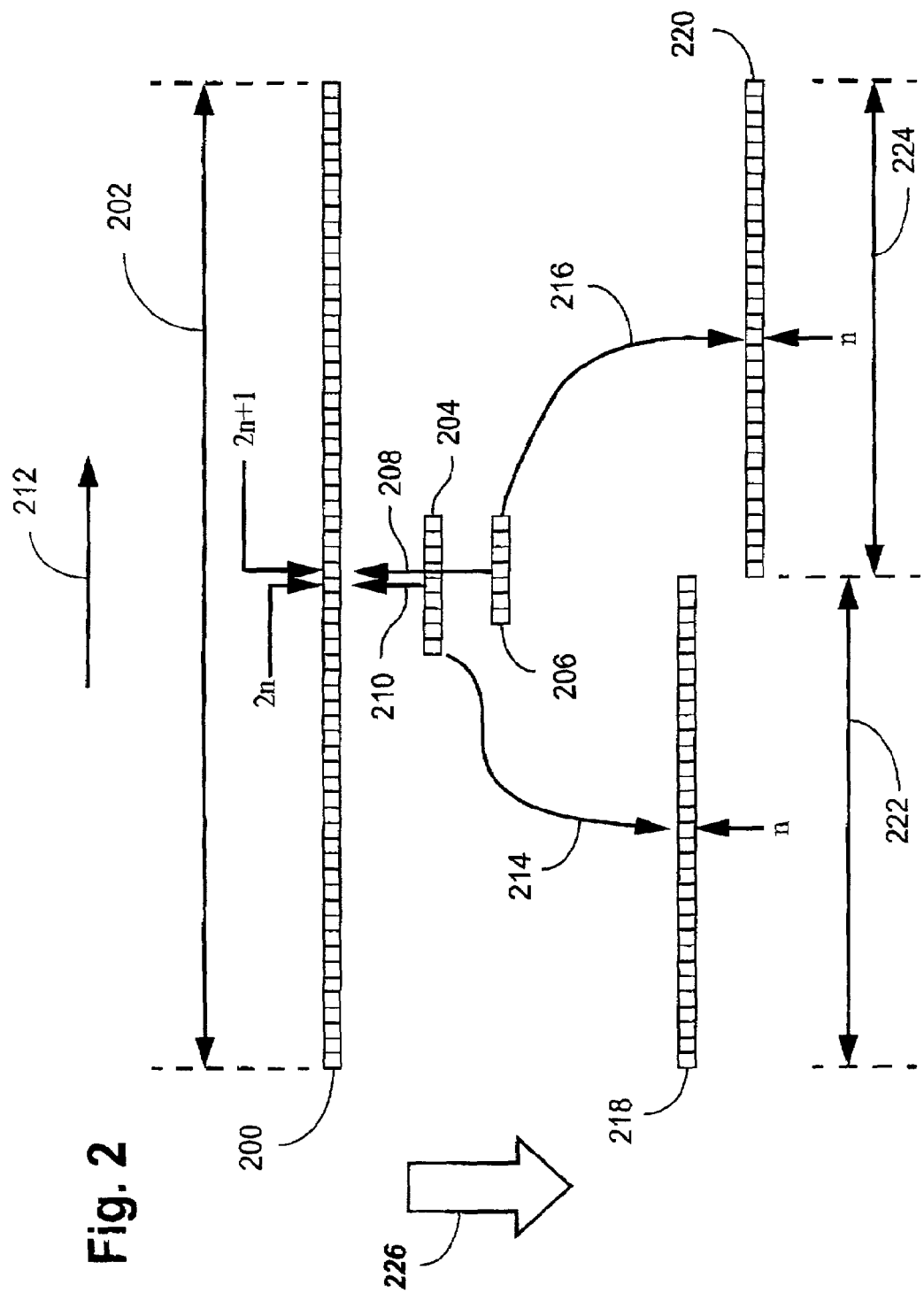
FIG. 2 illustrates the DWT process in FIG. 1 at a data-bit level.

FIG. 2 illustrates a single-level embodiment for a forward, ie. DWT process (the "forward" direction being depicted by an arrow 226) in somewhat more detail. A low pass filter 204 and a high pass filter 206 being centred according to the arrows 210 and 208 respectively are applied to a data set 200. Bach filter thus convolves data from the data set 200, the output from the low pass and high pass filters being depicted by arrows 214 and 216 respectively The low pass filter 204 and high pass filter 206 are centred at points 2n and 2n+1 in the data set 200, and produce data points "n" in the respective sub-bands 218 and 220. It is further noted that the length 202 of the data set 200 is twice as long as the respective lengths 222, 224 of the respective sub-bands 218 and 220. This "halving" of data length derives from the down-sampling inherent in the DWT process. The filters 204 and 206 are "slid" along the data set 200 in 2 data-point increments, the two-point increment being indicative of a downsampling process, in a direction depicted by an arrow 212.

Figure 3:
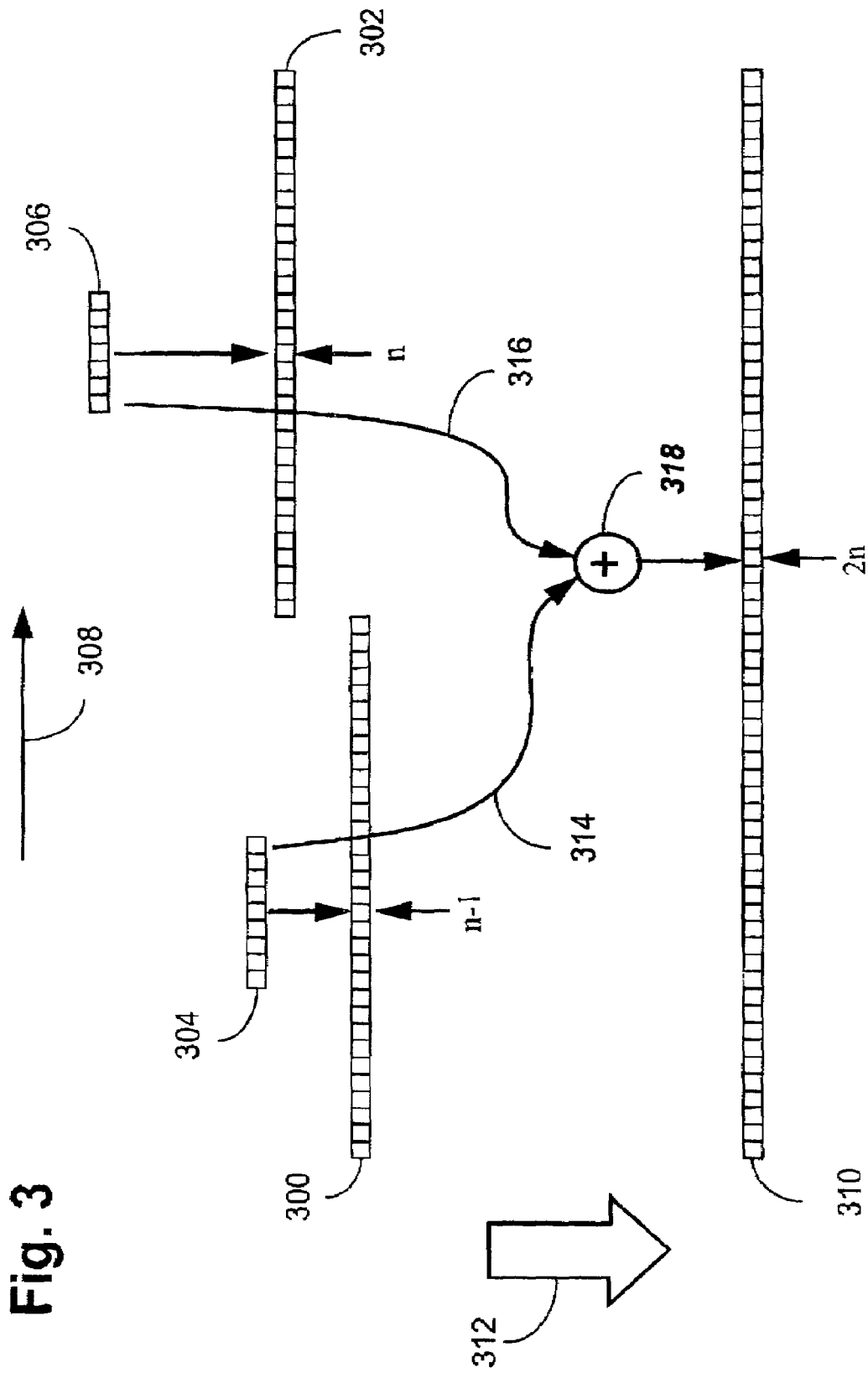
FIG. 3 depicts the IDWT process in FIG. 1 at a data-bit level.

FIG. 3 illustrates a single-level embodiment of an IDWT or inverse transform process, the inverse nature of the transform process being depicted by an arrow 312. In this case, a low pass filter 306 and a high pass filter 304 are centred as shown on bits "n" and "n−1" of the sub-bands 302 and 300 respectively. Convolution of these filters with the data about their respective centres results (see FIG. 4 for more detail), as depicted by arrows 316 and 314 respectively, after addition in an adder 318, in an output data point "2n" in the resultant inverse-transformed data set 310. The filters 306, 304 are slid in single data-point increments in a direction depicted by an arrow 308.

Figure 4:
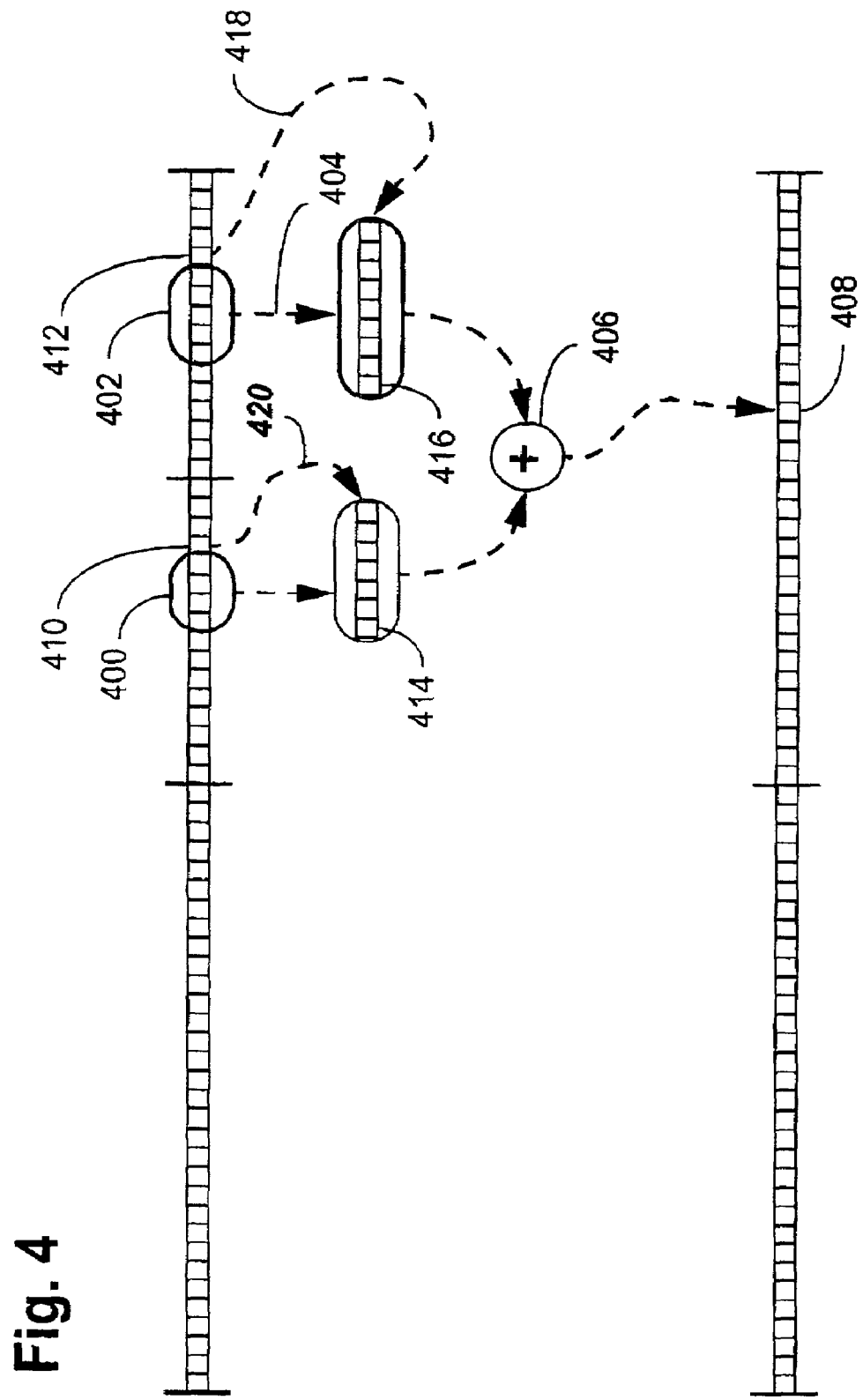
FIG. 4 illustrates an up-sampling/convolution process used in the IDWT process in FIG. 1.

FIG. 4 illustrates the single-level inverse transform operation described in relation to FIG. 3 in somewhat more detail. Considering a low pass filter 414, it is seen that the length of the filter is 7 data points long. Similarly, a high pass filter 416 is seen to have a length of 9 data points. Due to the up-sampling process inherent in the inverse DWT, the 7 bits required by the low pass filter 414 are derived, ie, the filter is "filled" by up-sampling 4 bits (depicted as 400), the up-sampling process inserting a "0" in between points in the set of data 400 in order to produce the 7 bits required for the low pass filter 414. This up-sampling process is depicted by a dashed arrow 420. Similarly, a data set 402 is up-sampled as depicted by a dashed arrow 418 in order to "fill" the high pass filter 416. Each of the aforementioned filters convolves their respective up-sampled data set, the results of the two convolutions being added in an adder 406, resulting in an output point 408. The convolution computation is expressed mathematically in Equation (1) in relation to FIG. 15.

Figure 5:
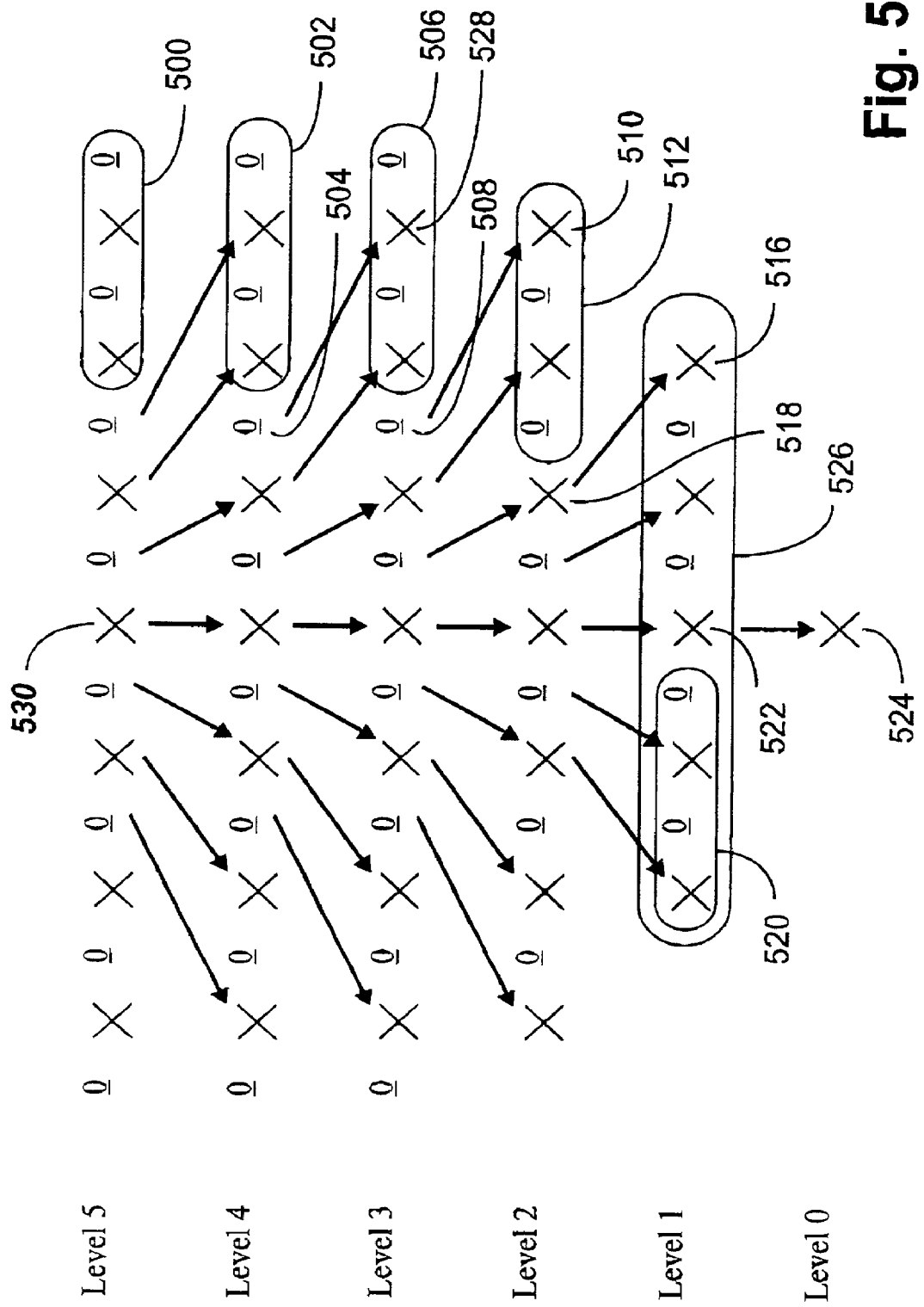
FIG. 5 illustrates data requirements at different levels in an IDWT process.

In FIG. 5, the IDWT data requirements at each level of transformed data which is necessary to produce a single output point is considered. A single output point 524 at level 0 requires enough data from the first level sub-band to satisfy the requirements of the kernel of the IDWT process, ie. to "fill" the relevant filter. Considering the present embodiment using a low pass filter having nine taps, the output point 524 requires that the filter represented as 526 be filled with nine data points. The filter 526 is centred on a data point 522. It is noted that the data points depicted by an "X", eg. 516, are "real" data points, whereas data points represented by a "0" are not real data points, but rather zeros which are inserted by the up-sampling process. Therefore, the filter 526, while needing the total of 9 points in order to produce the output point 524, in reality only requires five real data points as shown by the "X"s. From another perspective, an output point 524 being centred on the filter centre point 522 requires a set of four data points 520 on either side of the filter centre point 522. Therefore, a level one data point 516 being centred on a level 2 data point 518 requires the set of four data points 512 on the right hand side of the filter centre data point 518. Going up a level, the extreme right hand data point 510 at level 2, being centred on a level 3 data point 508 requires that the filter centre point 508 have a set of four data points 506 available. Moving yet one level up, a level 3 extreme right hand real point 528, being centred on a level 4 data point 504 requires that the level 4 data point 504 have four data points 502 available. It is thus seen, by the time we consider level 4, that the width of the overall data set required to support the original output point 524 is no longer increasing in size. In fact, looking at level 5, it is seen that a centre data point 530 requires 7 data points on either side in order to satisfy the production of the final output point 524 at level 0. Furthermore, the data point 530 requires only three real data points on either side, ie. a total of seven real data points is required. This is also the case for all subsequent levels beyond level 5. The fact that the required data set width becomes bounded at a certain point, or rather a certain level, can be exploited in a multi-level IDWT in order to produce output points in a raster, or band fashion, using a pipe-line process and fixed data-width filters, This is explained in relation to FIGS. 6 and 7.

Figure 6:
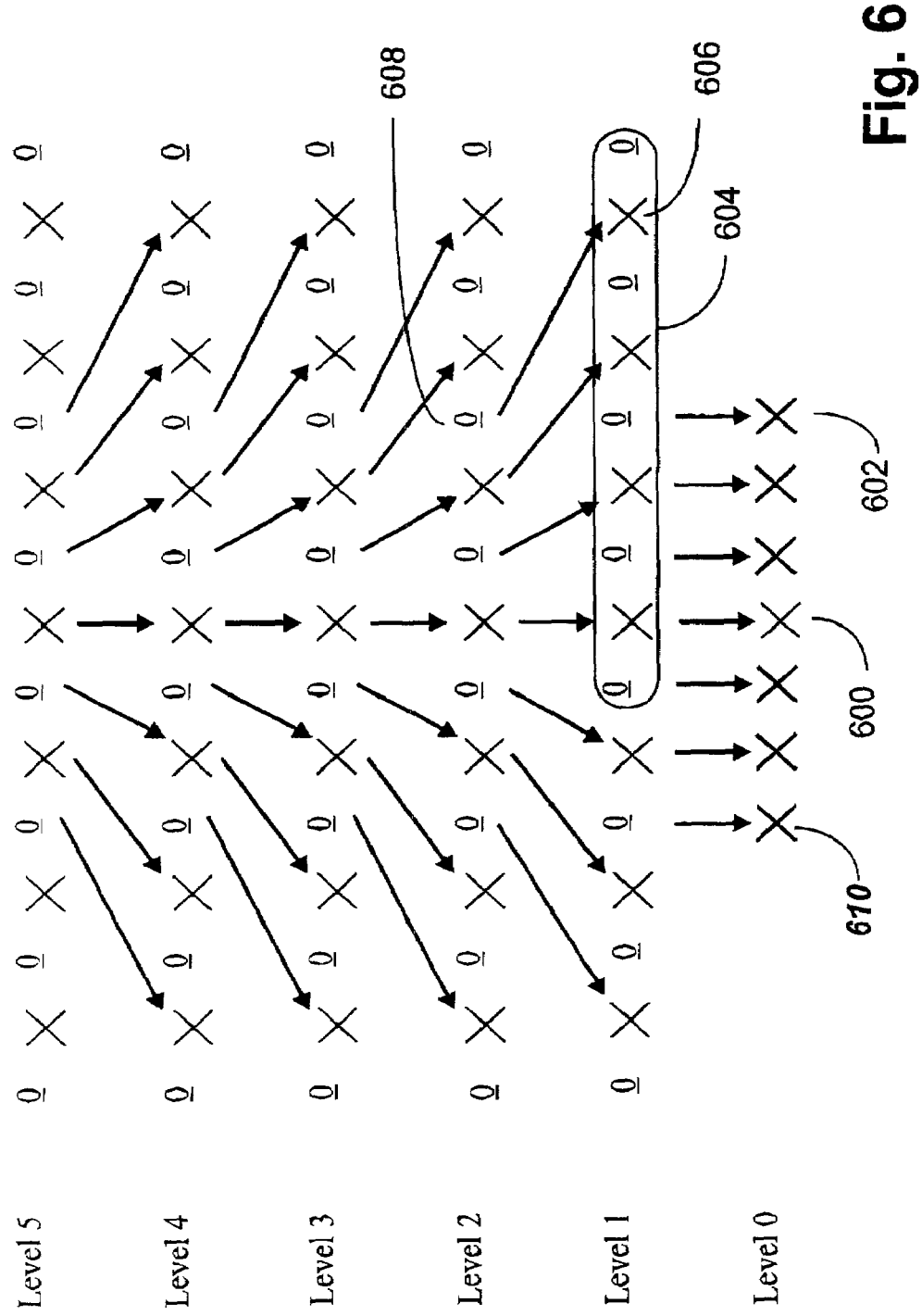
FIG. 6 illustrates the aforementioned data requirements in a preferred embodiment of the present invention.

In FIG. 6, since for all levels beyond level one in FIG. 5, seven real points are required, it is expeditious to standardise on this number of points at all levels including level 1. Since zeros at the extremities of the data sets are inserted by the up-sampling process without requirement for real data from the preceeding levels, it is seen, in a static situation where the filters are not "slid" along the data set as described in relation to FIG. 2, that the use of seven real data points at each level allows seven output points 610 to 602 to be produced, these being centred on data point 600. It is found, however, that this configuration can be improved by using eight points at each level, thereby producing eight output points. When using the eight data point configuration, the filters required are constant in size, ie they require a constant number of real points from the preceding level, as they are slid along the data points in question. If, however, the seven point configuration is used, the filters at the various levels typically oscillate in size by approximately one real data point, which complicates the implementation In conclusion therefore, for any number of levels, extraction of eight data points at each level, when considering the particular filter described and taking into account the up-sampling process, allows eight output points to be produced (see FIG. 7).

If the number of levels exceeds the capacity implemented in hardware, the computation can be folded, ie a multi-stage pipeline can be used. This is described in more detail in regard to FIGS. 20 and 21.

Figure 7:
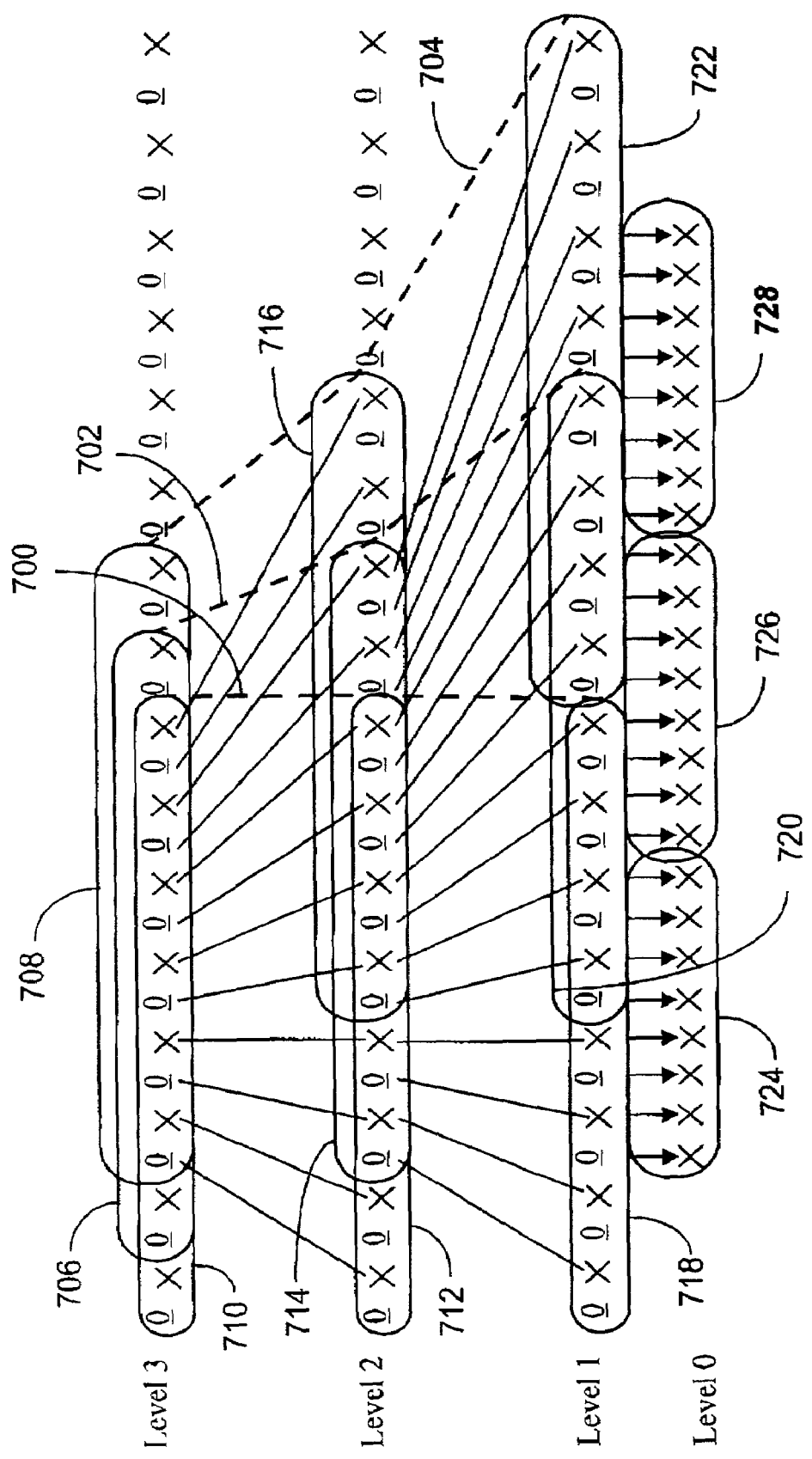
FIG. 7 depicts "sliding" filters used in relation to FIG. 6.

FIG. 7 illustrates a three level IDWT process, still in relation to the one-dimensional data set. Considering a first set of eight output points 724, we see that filters 718, 712 and 710 are filled with the appropriate eight points of real data plus corresponding upsampled zeros, at levels one, two and three respectively. The convolution outputs of these three filters in tandem produce the set of output points 724. Thereafter, the level one filter 718 is slid to the right to a position depicted by 720. The level two filter 712 is similarly slid to the right as depicted by 714, and the level three filter 710 slid to the right as depicted by 706. The initial lateral position of the set of filters is depicted by a dashed line 700, whereas their lateral position is depicted by a dashed line 702 after the sliding operation just described, The three filters 706, 714 and 720, produce a second set of eight output points 726 by convolution of the data points in the filters. By sliding the respective filters to alignment positions depicted by a dashed line 704, a third set of eight output points 728 is produced. To summarise the implication of the embodiment shown in FIG. 7, it is noted that the use of fixed-width filters at each and every band of the multi-level IDWT data set results in production of a band of data at level 0. The practical implication is that instead of utilising the prior art level-by-level method of performing the IDWT, a pipeline process call be implemented, whereby output data can be produced in raster, or band fashion, using a pipeline process of fixed data width.

Figure 8:
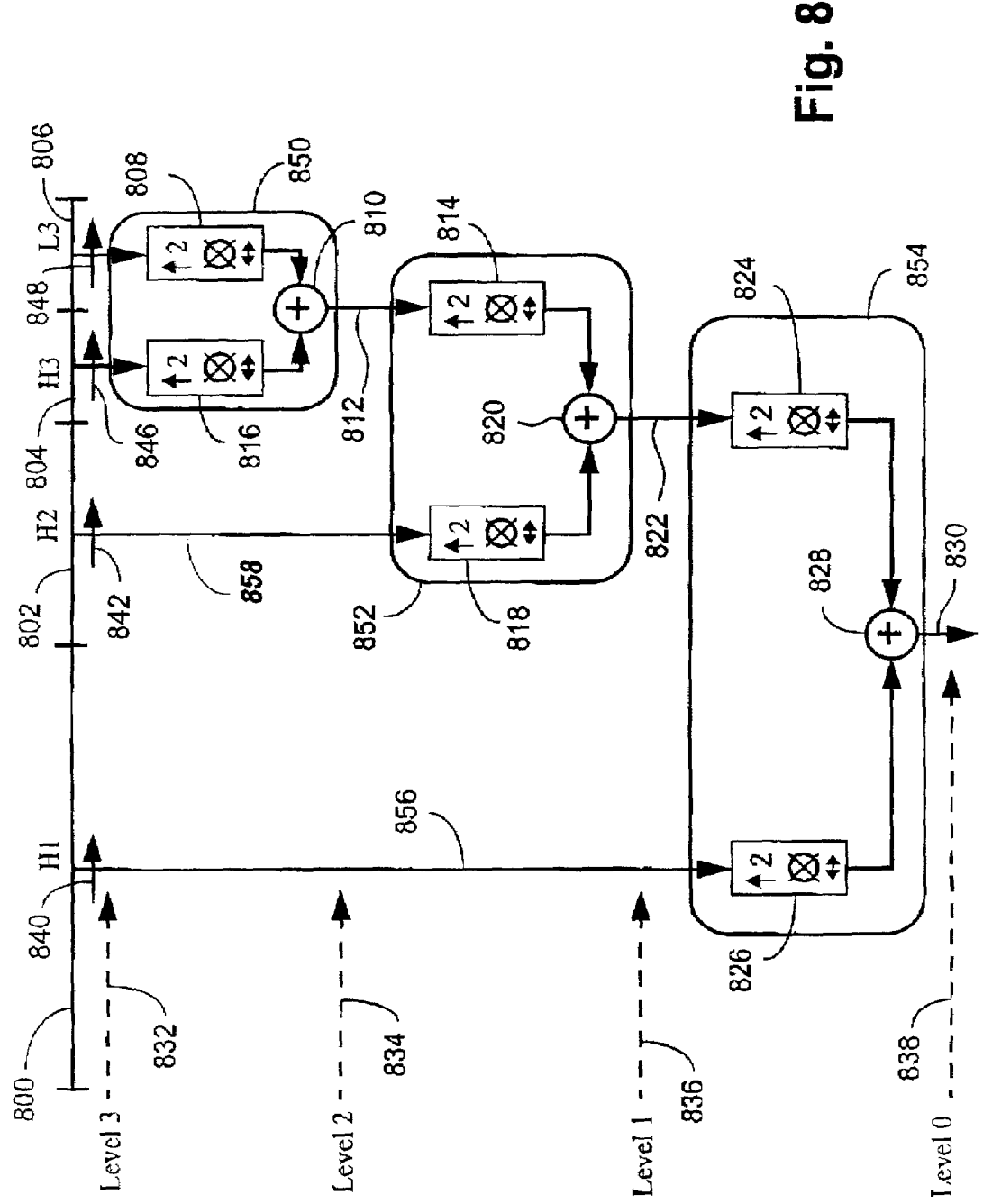
FIG. 8 illustrates a multi-level IDWT process according to FIG. 6.

FIG. 8 presents a block representation, and depicts how an output point 830 is produced by a tandem arrangement of computational blocks 850, 852 and 854. The block 850 comprises two computational sub-blocks 808 and 816, each of these sub-blocks providing for up-sampling and convolution of respective data points from sub-bands 804 and 806. The up-sampled convolved data points are added in an adder 810, and together with respective data from a sub-band 802, are directed to the next level computational block 852. The output of block 852 is directed as depicted by an arrow 822 along with data from the next sub-band level 800 as depicted by an arrow 856, to the final computational block 854, which in turn produces the output point 830. Each computational sub-block 808 comprises an up-sampling/convolving process. The convolution, as described in, for example, FIG. 7, is performed by an appropriate IDWT synthesis filter. The up-sampling process is easily performed by inserting zeros between real data points as appropriate. Each computational sub-block 808 is slid to the right as depicted by an arrow 848, in a similar manner to that described in FIG. 7. This same sliding operation is performed for all computation blocks 826, 818, 816 and 808 as depicted by arrows 840, 842, 846 and 848 respectively. The outputs of each computational block 850 are fed in parallel cascade, to the computational block 852 at the next level, and so on. Thus, for each pair of levels, for example, level 3 (ie. 832) and level 2 (ie. 834), a set of sub-bands 804, 806 is inverse transformed by the computational block 850 to form data, depicted by an arrow 812, at a second sub-band level 812, which together with associated sub-band data 802 is again subjected to the IDWT process as performed by the computational block 852.

Figure 9:
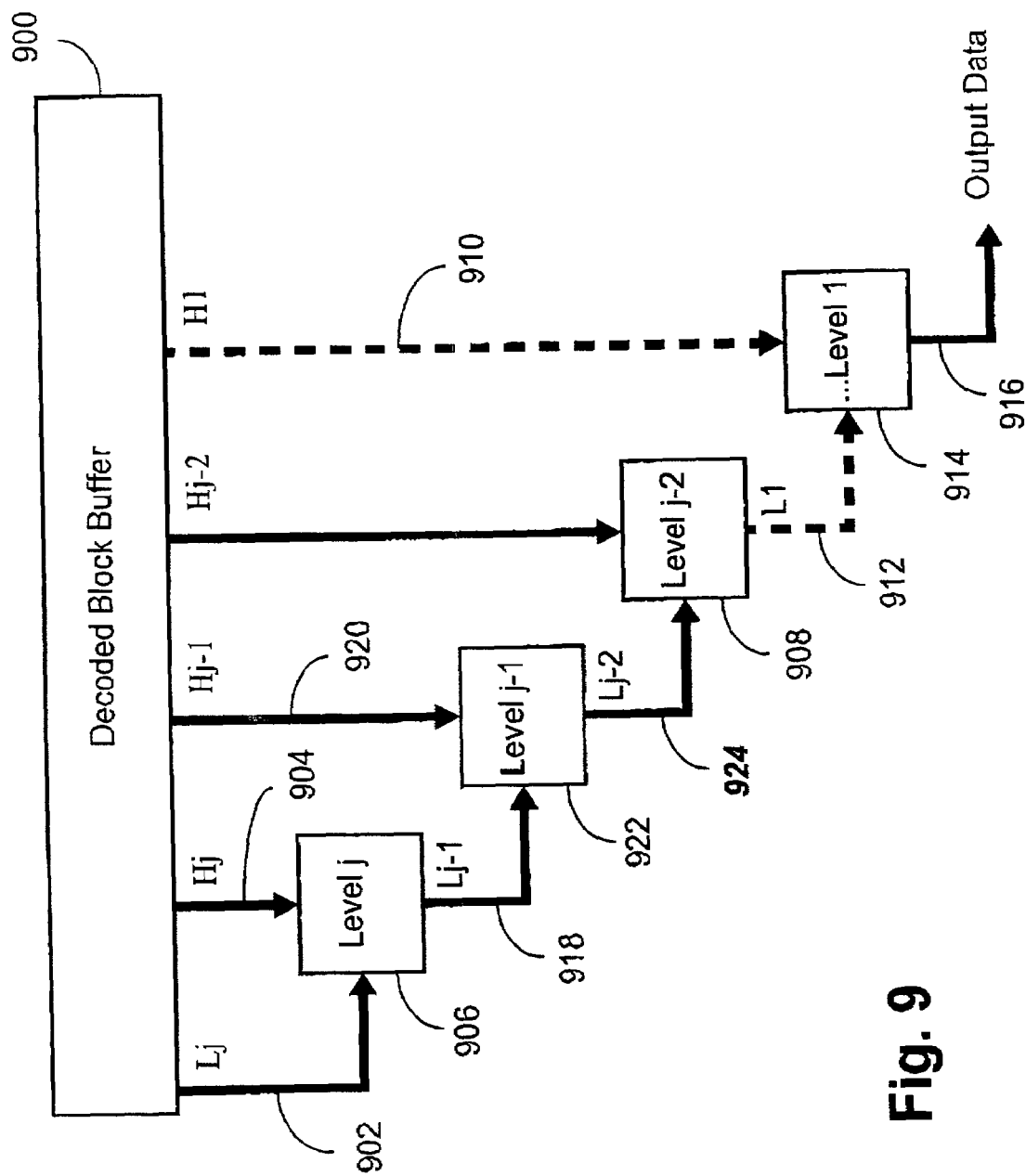
FIG. 9 depicts the cascaded nature of the IDWT process in FIG. 6.

FIG. 9 presents a block representation of the arrangement in FIG. 8, where a computational block 906, receives input sub-band data 902, and 904 from a block buffer 900. The computational block 906 feeds an output 918 to a computational block 922 at the next level, which together with an input 920 from the block buffer 900 produces data 924 for the next sub-band layer, and so on. Finally output data 916 is produced. The arrangement in FIG. 9 shows a computational block eg. 906, being associated with each level. It is recalled from FIG. 6, that a single data point at a given level is equivalent to two data points at the next lower level because of the up-sampling process in the IDWT. Therefore from a computation perspective, a computational block 914 at level 1 performs twice as many computations per unit time as the equivalent computational block 908 one level up ie. at level 2. Generalising this principle, if the computational block 914 is defined as performing computations 100% of the time, then the computational block at level 2 will be performing computation for only 50% of the time, and the computational block on level three, for only 25% of the time. Therefore, considering a j level transform, the computational blocks for levels 2 through j, are "busy" for a total time which can be represented mathematically by the following series:

$$\tfrac{1}{2}+\tfrac{1}{4}+\tfrac{1}{8}+\tfrac{1}{16}+ \ldots +(\tfrac{1}{2})^{j-1}.$$

The above series converges to "1", and therefore we conclude that one computational block is required for level 1 processing, and a second computational block can be shared by all other levels, from level 2 through to level j. This conclusion is based only upon a consideration of the relative "busy" times of computational blocks at each level. Accordingly, some implementations may in fact use more than the minimum two computational blocks described, in order to take account of other factors such as time taken to switch a computational block between levels.

Figure 10:
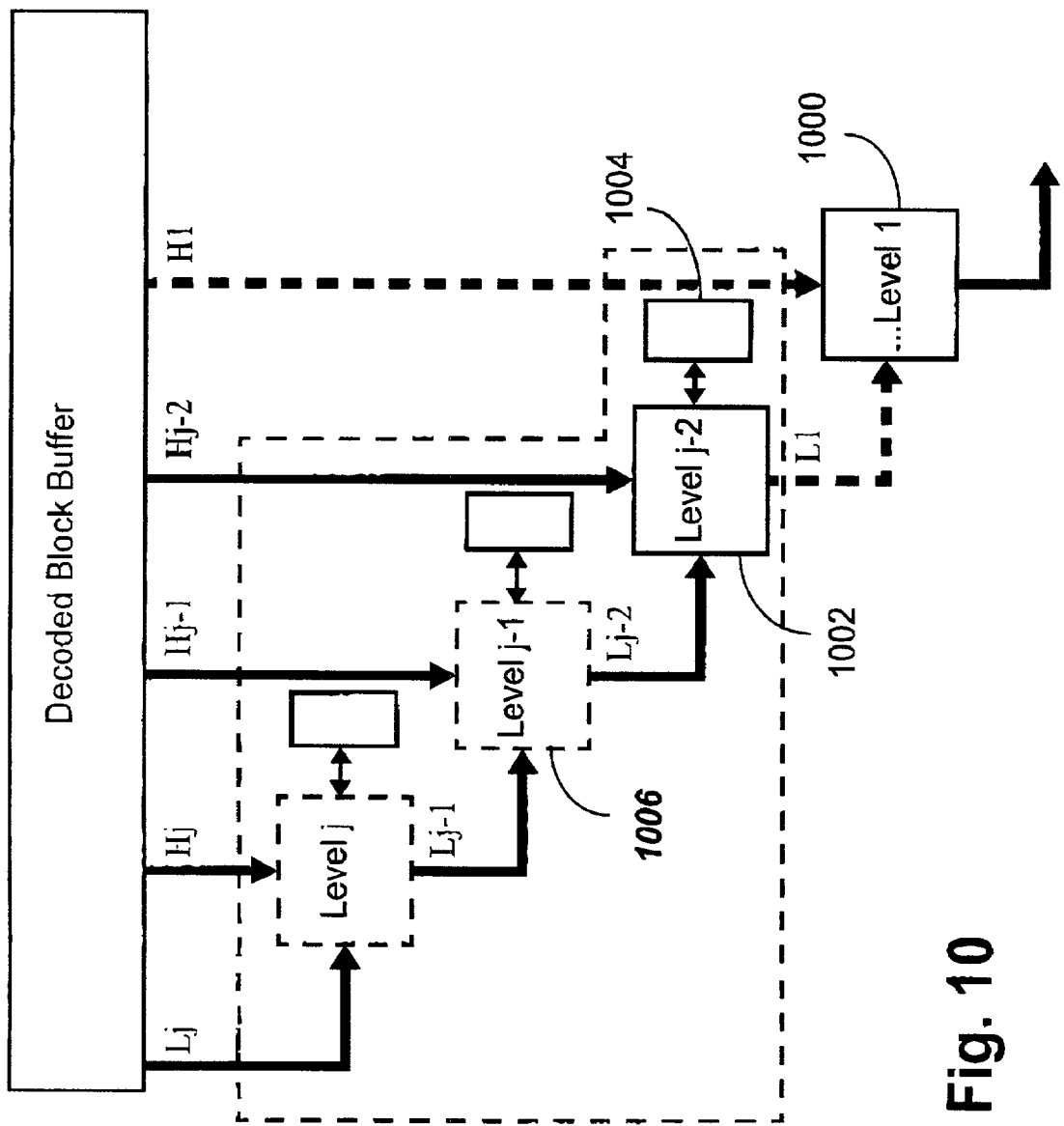
FIG. 10 illustrates the use of "virtual" computational blocks in the preferred embodiment.

The aforementioned principle is utilised as shown in FIG. 10, where a computational block 1000 is required at level 1, and a second computational block 1002 is shared among all the remaining levels, the block 1002 being switched between levels, to act as a "virtual" computational block as depicted, for example, by a dashed block 1006. This represents a significant saving in computational hardware, at the cost of switching hardware required to switch the block 1002 between levels, and possibly, a small memory 1004 to save the state information from each computational block 1002 while it is being used at another level, eg. 1006.

Figure 11:
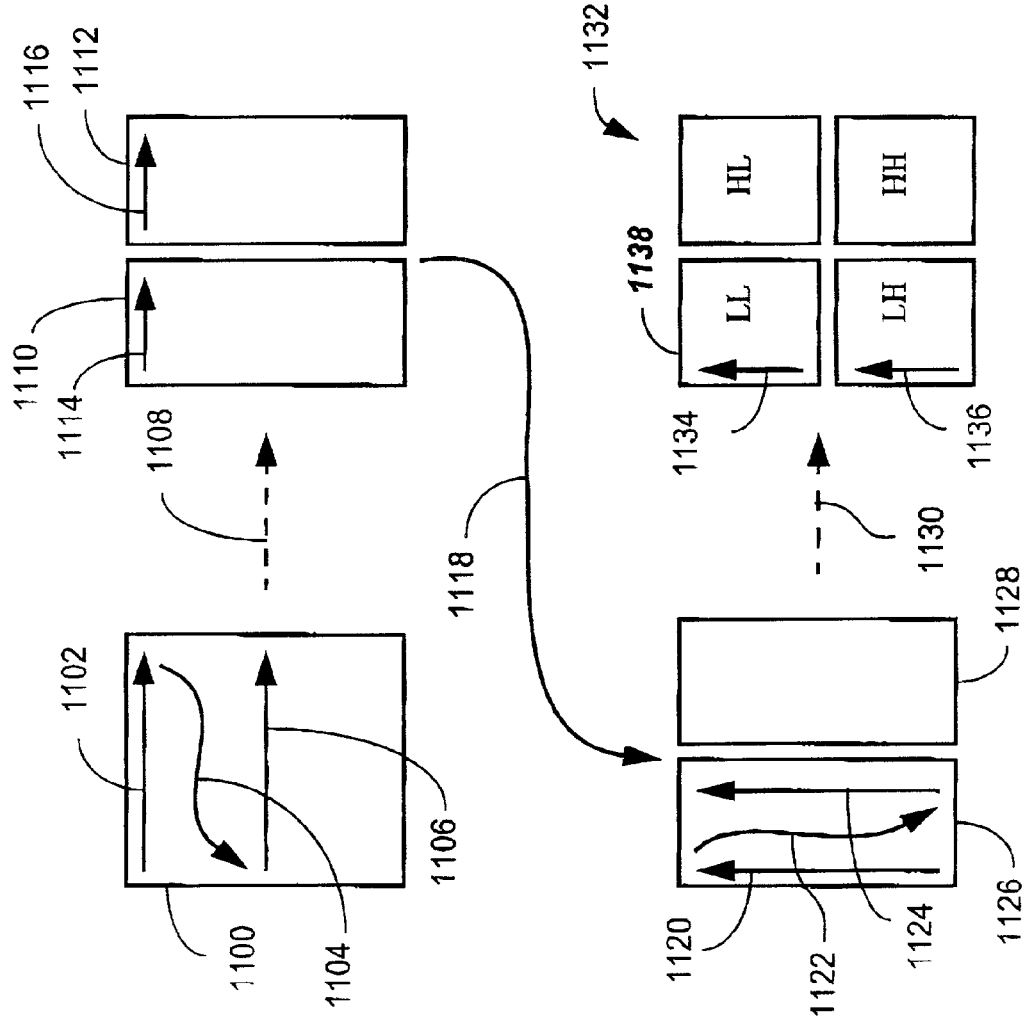
FIG. 11 illustrates a one-level DWT process for two dimensional data.

FIG. 11 depicts a single level DWT for two-dimensional data. A data set 1100 is first "row-transformed" as depicted by an arrow 1102, the high and low pass filters being translated two data points at a time as described in relation to FIG. 2, and then moved to a next line 1106 as depicted by a retrace arrow 1104 after each row 1102 of data is transformed. Once the data set 1100 is fully transformed, as depicted by a dashed arrow 1108, it is represented, by two data sots 1110 and 1116, having down-sampled row-transformed data 1114 and 1116 respectively. These transformed data sets 1110 and 1112 are then, as depicted by an arrow 1118, subjected to column data transformation as depicted by an arrow 1120, each column being fully transformed, and the transform filters then being moved to another column 1124 as depicted by an arrow 1122. At the end of the column transform process, the data is transformed as represented by a dashed arrow 1130, into a set of four sub-bands 1132.

Considering a transform with j levels, at each level other than level j, the data for an LL sub-band 1138 will be generated by the application of the IDWT at a previous level, the data for the previous sub-bands being retrieved from associated decoded blocks being held in memory, similar to the block buffer 900 in FIG. 9 for the one-dimensional case.

Figure 12:
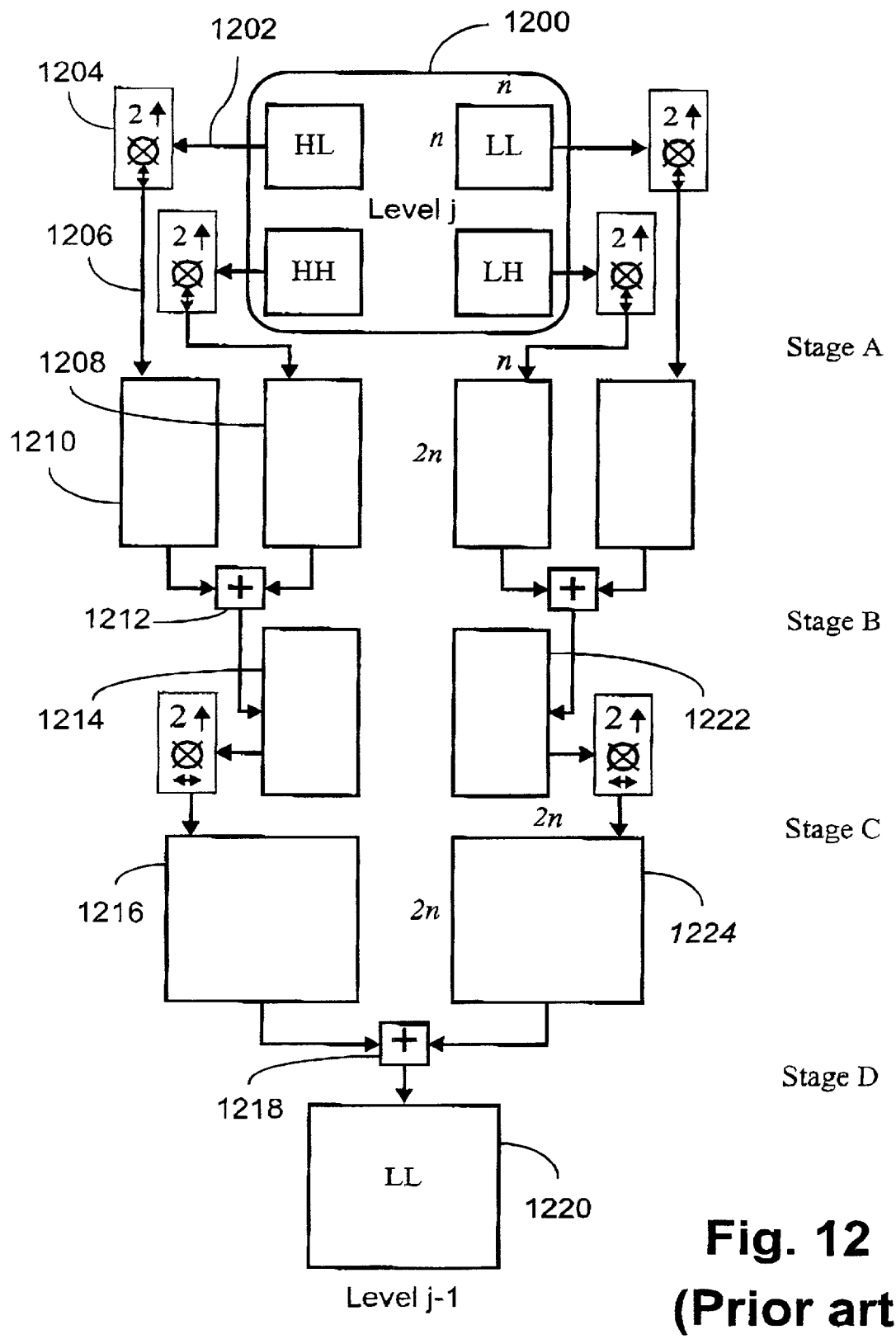
FIG. 12 illustrates a prior art embodiment for performing a two-dimensional IDWT in relation to FIG. 11.

FIG. 12 presents, as a basis for further discussion, a description of an IDWT process at a particular level in a conventional memory based approach for two-dimensional data. Processing takes place in a number of stages. Stage A shows the four sub-bands 1200 at a particular level. All sub-bands 1200 have the following operations performed upon them: an up-sampling by two and a filtering (ie. convolution) in the vertical direction as depicted for example, by a computational block 1204. Stage A is completed when all the results for each sub-band in 1200 have been written to a memory, eg. 1208, 1210. Stage B retrieves the results associated with the previous sub-bands 1200 from memory 1210, 1208, which are added pair wise in adders, eg. 1212, and the results stored in a memory 1214. Stage C is completed when all the results for each data set have been written to memory 1216 and 1224. Stage D retrieves the results associated with each data set from memory 1216, 1224, these being added in an adder 1218 to form the final data set 1220. At this stage, the data for the LL sub-band for the next level has been generated, and the whole process may be repeated at the next level. The aforementioned process occurs repeatedly at each level, until all levels are processed and the final output data is produced.

Recalling FIG. 6, and extrapolating the one-dimensional concept to the two-dimensional case, an area of 8×8 "real" points at a level will be seen to satisfy the requirements of the next level, thereby generating 8×8 "real" points at that next level. This principle holds for all levels. Therefore a 8×8 area if provided at each level, will produce 8×8 output data at level 0.

Figure 13:
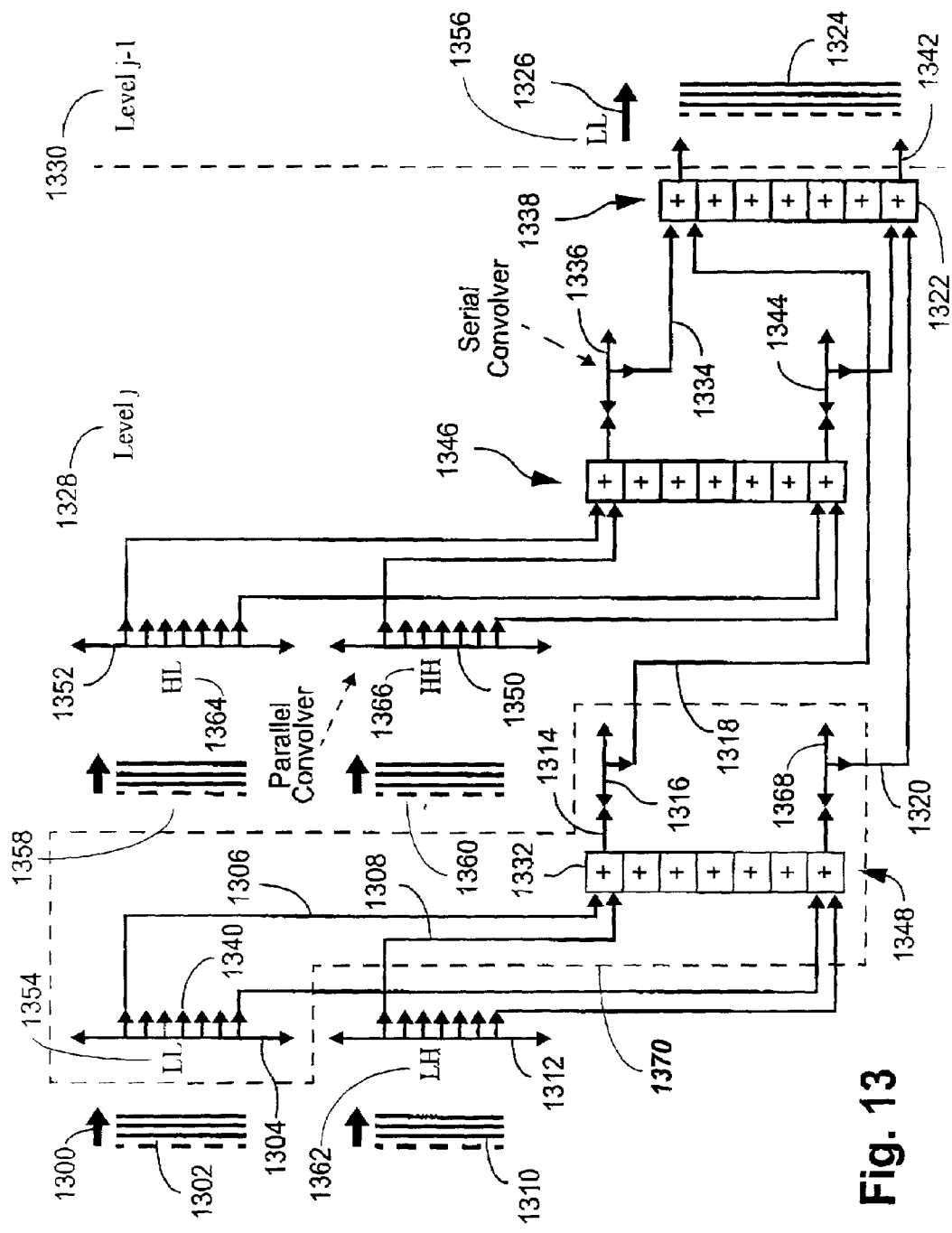
FIG. 13 illustrates a preferred embodiment for performing a two-dimensional IDWT according to the present invention.

FIG. 13 depicts a preferred embodiment for the two-dimensional case which takes advantage of the aforementioned feature. The figure describes an IDWT computation block at level 1, i.e., the level which produces output data at level 0 The computational block takes the same form at each level however. In addition, we recall the fact that resource sharing is possible so that computational blocks can be shared between levels.

The embodiment in FIG. 13 is described in relation to a 7×7 point computation, however it is not limited thereto. The embodiment produces a column of seven output pixels 1324 on each occasion that a column of input data eg. 1302 is clocked into parallel convolvers eg. 1304, once sequential convolvers eg. 1316 have filled with data. The combination of a parallel convolver 1304, associated adders 1332, and associated sequential convolvers (eg 1316), witch are contained in a dashed box outline 1370, are referred to as a two-dimensional separable IDWT transformer, which is described in more detail in relation to FIGS. 14 to 16, as will the interpolator function which performs upconversion which is not shown explicitly in FIG. 13.

To perform the operations in the vertical direction, four parallel convolvers eg. 1304 are used, one per sub-band. Each such convolver 1304 simultaneously produces the results of the vertical kernel (ie. filter) applied separately at seven input "real" points. Thus, instead of the filter "sliding" as depicted in FIG. 7, data is loaded into the parallel convolvers in parallel. The total number of points 1302 required to produce the seven outputs 1340 centred around these points 1302 is 15 points, ie. the seven real points and eight zeros that are the result of up-sampling the data. The zeros need not be read from memory, and may be inserted by suitable implementation of the convolver itself.

Thus from each sub-band, a column of seven points 1302 is input. Corresponding intermediate points for the LL and LH sub-bands, eg. 1306 and 1308 respectively, are added in an adder 1332. The output of the adder 1332 is fed into the sequential convolver 1316 which operates in the horizontal direction, one sequential convolver 1316 being required per output point in the data set 1340 which is output by the parallel converter 1304. As data is stepped into the horizontal convolvers eg. 1316, a line of output data 1318 is progressively generated. Finally corresponding data, eg. 1318 and 1334, from the left and right horizontal serial convolvers 1316 and 1336 are added in an adder 1338. The result is to produce seven lines 1342 of fully convolved data that are built up sequentially, meaning that all lines are produced in parallel (ie. 1324), concurrently, one point at a time in raster order, at a rate that the serial convolvers, eg. 1316, have data fed into them. The output from the final adder stage 1338, is in fact the LL sub-band data required by the next level.

When the computational block depicted in FIG. 13 is applied at other levels e.g. level 2, it is noted that once a level e.g., level 2, has produced seven columns of LL data 1324 for the next lower level e.g., level 1, further LL data 1324 from level 2 is only generated when required by the next level i.e., level 1. This relates to the aspect of up-sampling between levels, and the consequent differing rates of computational requirements at each level.

The present two-dimensional embodiment as described in relation to FIG. 13 progresses In one-step data point increments from left to right in the horizontal direction, and thereby generates a band of data eg. 1324 in raster order, the band being seven data points wide. At the end of a traversal across the sub-bands in a horizontal direction, the process steps down seven rows in the vertical direction and re-traces in a right to left direction, in order to continue the inverse transformation process.

Figure 14:
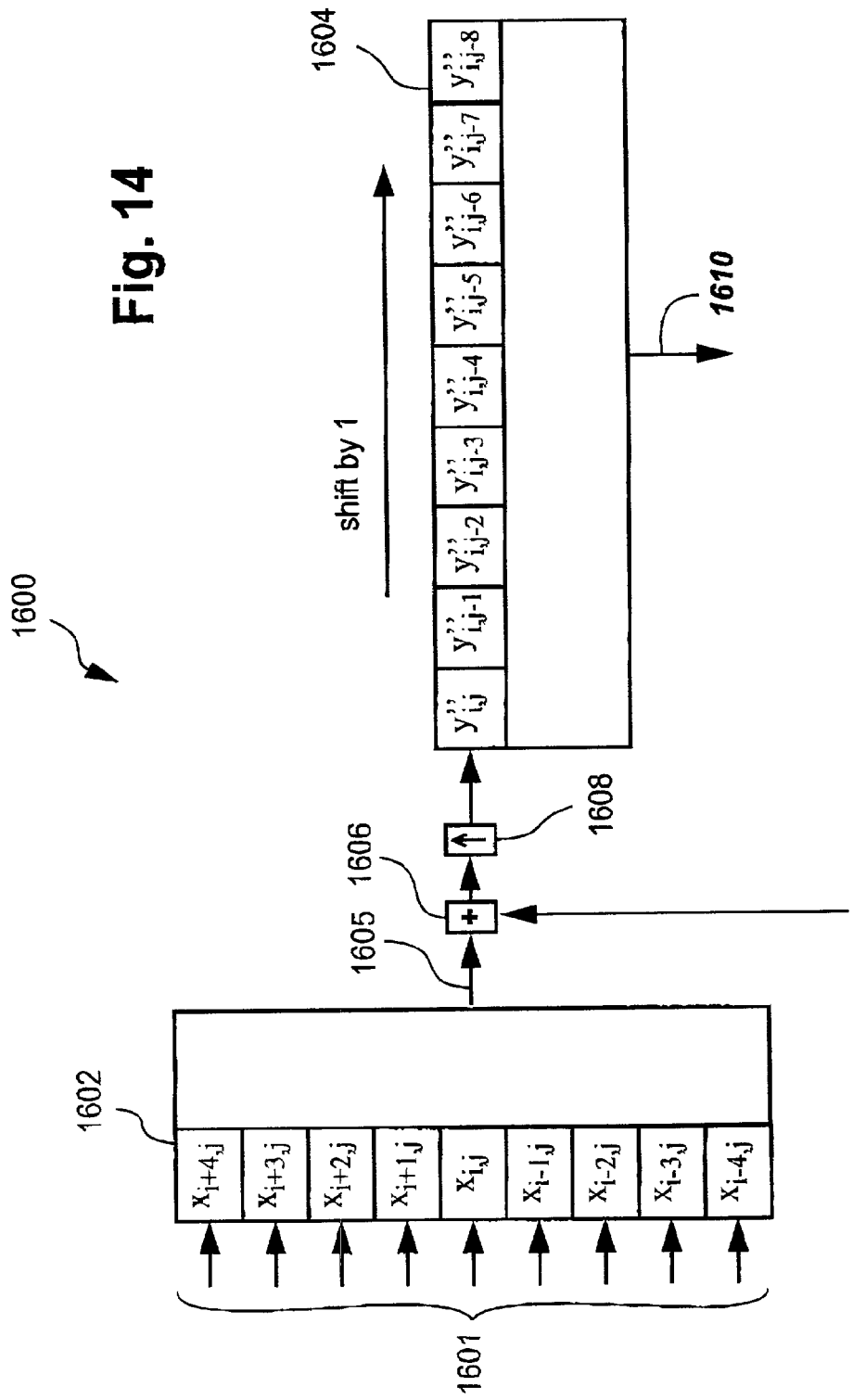
FIG. 14 is an arrangment of part of an inverse two-dimensional separable DWT transformer in accordance with a first preferred embodiment.

FIG. 14 shows a schematic representation of part of an inverse two-dimensional separable DWT transformer. The arrangement 1600 comprises a vertical filter 1602 feeding a horizontal filter 1604 via an adder 1606 and an interpolator 1608.

For ease of explanation, the operation of the arrangement of FIG. 14 is described with reference to a wavelet transform sub-band having a plurality of transform coefficients $x_{r,s}$ arranged in a plurality of rows r and columns s. The vertical filter 1602 has multiple parallel inputs 1601 and one output channel 1605. In this particular example, the vertical filter 1602 has nine taps and nine parallel inputs 1601 but is not intended to be limited thereto. Similarly, the horizontal filter 1604 has nine taps but is not intended to be limited thereto.

At any one clock cycle, the vertical filter 1602 takes as its input nine transform coefficients { $x_{i-4j}$, $x_{i-3j}$, $x_{i-2j}$, $x_{i-1j}$, $x_{i,j}$, $x_{i+1j}$, $x_{i+2j}$, $x_{i+3j}$, $x_{i+4j}$ } of the wavelet transform sub-band. The vertical filter 1602 then calculates and outputs one intermediate transform coefficient $y_{ij}$ based on these input transform coefficients. That is, the filter 1602 undertakes a one-dimensional inverse transform in the vertical direction of the coefficients { $x_{i-4j}$, $x_{i-3j}$, $x_{i-2j}$, $x_{i-1j}$, $x_{i,j}$, $x_{i+1j}$, $x_{i+2j}$, $x_{i+3j}$, $x_{i+4j}$ }. Thus, the resultant intermediate coefficients $y_{ij}$ are one-dimensional transform coefficients in the horizontal direction of the image at position ij.

At the next clock cycle, the vertical filter 1602 takes as its input the nine transform coefficients { $x_{i-4j+1}$, $x_{i-3j+1}$, $x_{i-2j+1}$, $x_{i-1j+1}$, $x_{ij+1}$, $x_{i+1j+1}$, $x_{i+2j+1}$, $x_{i+3j+1}$, $x_{i+4j+1}$ } of the wavelet transform sub-band and outputs another intermediate transform coefficient $y_{i,j'''1}$. At the next clock cycle, the vertical filter 1602 takes as its input the nine transform coefficients { $x_{i-4j+2}$, $x_{i-3j+2}$, $x_{i-2j+2}$, $x_{i-1j+2}$, $x_{ij+2}$, $x_{i+1j+2}$, $x_{i+2j+2}$, $x_{i+3j+2}$, $x_{i+4j+2}$ } of the wavelet transform sub-band and outputs another intermediate transform coefficient $y_{ij+2}$. The vertical filter 1602 continues in this manner for each clock cycle until the end of the row i. The vertical filter 1602 then takes as its input the nine transform coefficients {$x_{i-3,0}$, $x_{i-2,0}$, $x_{i-1,0}$, $x_{i,0}$, $x_{i+1,0}$, $x_{i+2,0}$, $x_{i+3,0}$, $x_{i+4,0}$, $x_{i+5,0}$ } and continues in a similar manner as the previous row. As can be seen, the vertical filter 1602 receives as input groups of coefficients in sequence. Each group { $x_{i-4j}$, $x_{i-3j}$, $x_{i-2j}$, $x_{i-1j}$, $x_{i,j}$, $x_{i+1j}$, $x_{i+2j}$, $x_{i+3j}$, $x_{i+4j}$ } comprises nine adjacent coefficients arranged in the vertical direction of the image, four on each vertical side of the centre transform coefficient $x_{i,j}$. The vertical filter 1602 receives the groups of coefficients in a "raster" type scan order, viz the centre transform coefficient is sequentially input in raster scan order. Thus each transform coefficient $x_{ij}$ will need to be input into the vertical filter 1602 a number of times.

The intermediate transform coefficients $y_{ij}$, $y_{ij+1}$ and so on are fed to the adder 1606 in a pipeline manner and added to respective intermediate transform coefficients $y'_{ij}$, $y'_{ij'''1}$ from another vertical line filter (not shown). The added transform coefficients are then interpolated in the horizontal direction (up sampled) by an interpolator 1608. The interpolated transform coefficients $y''_{ij}$ are then fed to a horizontal line filter 1604.

At any one clock cycle, the horizontal filter 1604 takes one interpolated coefficient $y''_{ij}$ as input. The horizontal filter 1604 then calculates and outputs 1610 one coefficient $z_{ij-4}$ based on the input transform coefficients { $y''_{ij}$, $y''_{ij-1}$, $y''_{ij-2}$, $y''_{ij-3}$, $y''_{ij-4}$, $y''_{ij-5}$, $y''_{ij-6}$, $y''_{ij-7}$, $y''_{ij-8}$}, which are presently stored in the horizontal filter 1604. That is, the filter 1604 undertakes a one-dimensional inverse transform in the horizontal direction of the coefficients { $y''_{ij}$, $y''_{ij-1}$, $y''_{ij-2}$, $y''_{ij-3}$, $y''_{ij-4}$, $y''_{ij-5}$, $y''_{ij-6}$, $y''_{ij-7}$, $y''_{ij-8}$ At the next clock cycle, the horizontal filter 1604 takes as input the next interpolated coefficient $y''_{ij+1}$ and calculates and outputs 1610 the inverse transform coefficient based on the coefficients { $y''_{ij+1}$, $y''_{ij}$, $y''_{ij-1}$, $y''_{ij-2}$, $y''_{ij-3}$, $y''_{ij-4}$, $y''_{ij-5}$, $y''_{ij-6}$, $y''_{ij-7}$} presently stored therein. In this way, the horizontal filter acts as a shift register arrangement. The horizontal filter 1604 continues in this manner until the end of the row i after which it continues at the next row and so on. As can be seen, the horizontal filter 1604 is effectively four data points behind the vertical filter in calculating the inverse transform coefficient. The arrangement is such that the inverse transform coefficients are calculated in raster scan order.

It is preferable that edge mirroring be used to overcome the problems in calculating the inverse transform at the edge of the sub-band- For example, at the first clock cycle, the vertical filter 1602 takes as its input nine transform coefficients {$x_{-4,0}$, $x_{-3,0}$, $x_{-2,0}$, $x_{-1,0}$, $x_{0,0}$, $x_{1,0}$, $x_{2,0}$, $x_{3,0}$, $x_{4,0}$ } where the first (and last) four samples are mirrored as they are read into the vertical filter 1602. Alternatively, the first four samples may be set to zero As mentioned above, the horizontal filter 1604 is effectively four data points behind in calculating the inverse transform coefficient. Thus, the horizontal filter can be clocked to commence at the fifth sample in each row with the first (and last) four samples mirrored.

In this way, the arrangement provides for processing two-dimensional separable convolutional kernels such that the filtered output data can be produced in a linear direction at a high speed.

Figure 15:
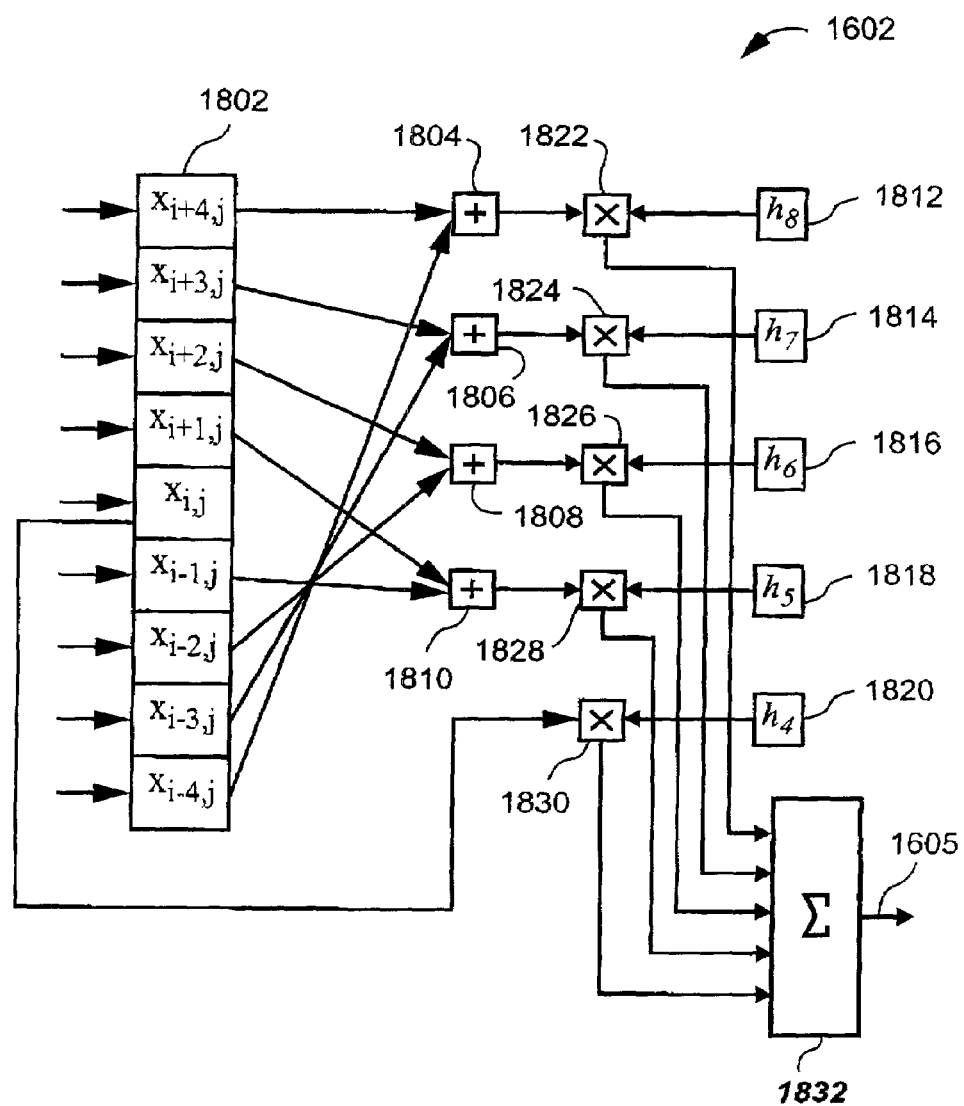
FIG. 15 shows a vertical filter arrangement which can be used in FIG. 14.

Turning now to FIG. 15, there is shown a block diagram of a parallel convolver suitable for use as the vertical filter 1602 shown in FIG. 14. The vertical filter 1602 comprises a memory array 1802 for receiving the nine transform coefficients {$x_{i-4j}$, $x_{i-3j}$, $x_{i-2j}$, $x_{i-1j}$, $x_{ij}$, $x_{i+1j}$, $x_{i+2j}$, $x_{i+3j}$, $x_{i+4j}$ } of the wavelet transform sub-band as input 1601 (see FIG. 14). The vertical filter 1602 further comprises four adders 1804, 1806, 1808, and 1810 for adding together the transform coefficients stored in the memory array 1802. In this regard, the adder 1804 adds together the transform coefficients $x_{i-4j}$ and $x_{i+4j}$, the adder 1806 adds together the transform coefficients $x_{i-3j}$ and $x_{i+3j}$, the adder 1808 adds together the transform coefficients $x_{i-2j}$ and $x_{i+2j}$, and the adder 1810 adds together the transform coefficients $x_{i-1j}$ and $x_{i+1j}$. The vertical filter 1602, in addition, comprises five memory stores 1812, 1814, 1816, 1818 and 1820 for storing the filter coefficients $h_8$, $h_7$, $h_6$, $h_5$, and $h_4$. The vertical filter also comprises four multipliers 1822, 1824, 1826, and 1828 for multiplying the added transform coefficients output by the adders 1804, 1806, 1808, and 1810 by the filter coefficients $h_8$, $h_7$, $h_6$, and $h_5$ stored in memory stores 1812, 1814, 1816, and 1818 respectively In addition, the vertical filter 1602 comprises a further multiplier 1830 for multiplying the centre transform coefficient $x_{ij}$ stored in memory array 1802 by the centre filter coefficient $h_4$ stored in memory 1820. The results of the multipliers 1822, 1824, 1826, 1828, and 1830 are then fed to a summer 1832 which adds the results of the multipliers and feds them to an output channel 1605 of the vertical filter 1602. In this way, the vertical filter 1602 outputs an intermediate transform coefficient $y_{ij}$ one per clock cycle.

The typical representation of a convolution computation is expressed mathematically as:

$$y(n) = \sum_k h(n-k) \times (k) \qquad (1)$$

where y(n)=nth output point
h(n−k)=kth filter tap coefficient
x(k)=kth input point The parallel convolver 1602 shown in FIG. 15 takes advantage of the symmetry of the inverse wavelet kernel in that it minimizes the number of multipliers. The convolver 1602 adds the mirror image counterpart of a transform coefficient around the centre filter coefficient of the filter before applying the multiplication by the filter. Such may be derived by rearrangement of the convolution computation shown in Eqn (1) as follows:

$$y_{ij} = h_0 x_{i-cj} + h_1 x_{i-c+1j} + \ldots h_{2c} x_{i+cj} \qquad \text{Eqn. (2)}$$

where: $c=(N-1)/2$ and N is odd, (in this particular example, $N=9$).

As the wavelet is symmetrical then: $h_{c+k} = h_{c-k} \ldots$ (k<c) thereby enabling re-arrangement of the convolution computation (Eqn. (2)) to:

$$y_{ij} = h_c x_{ij} + h_{c+1}(x_{i+1j} + x_{i-1j}) + h_{c+2}(x_{i+2j} + x_{i-2j}) + \ldots$$
$$h_{2c}(x_{i+cj} + x_{i-cj}) \qquad \text{Eqn(3)}$$

Figure 16:
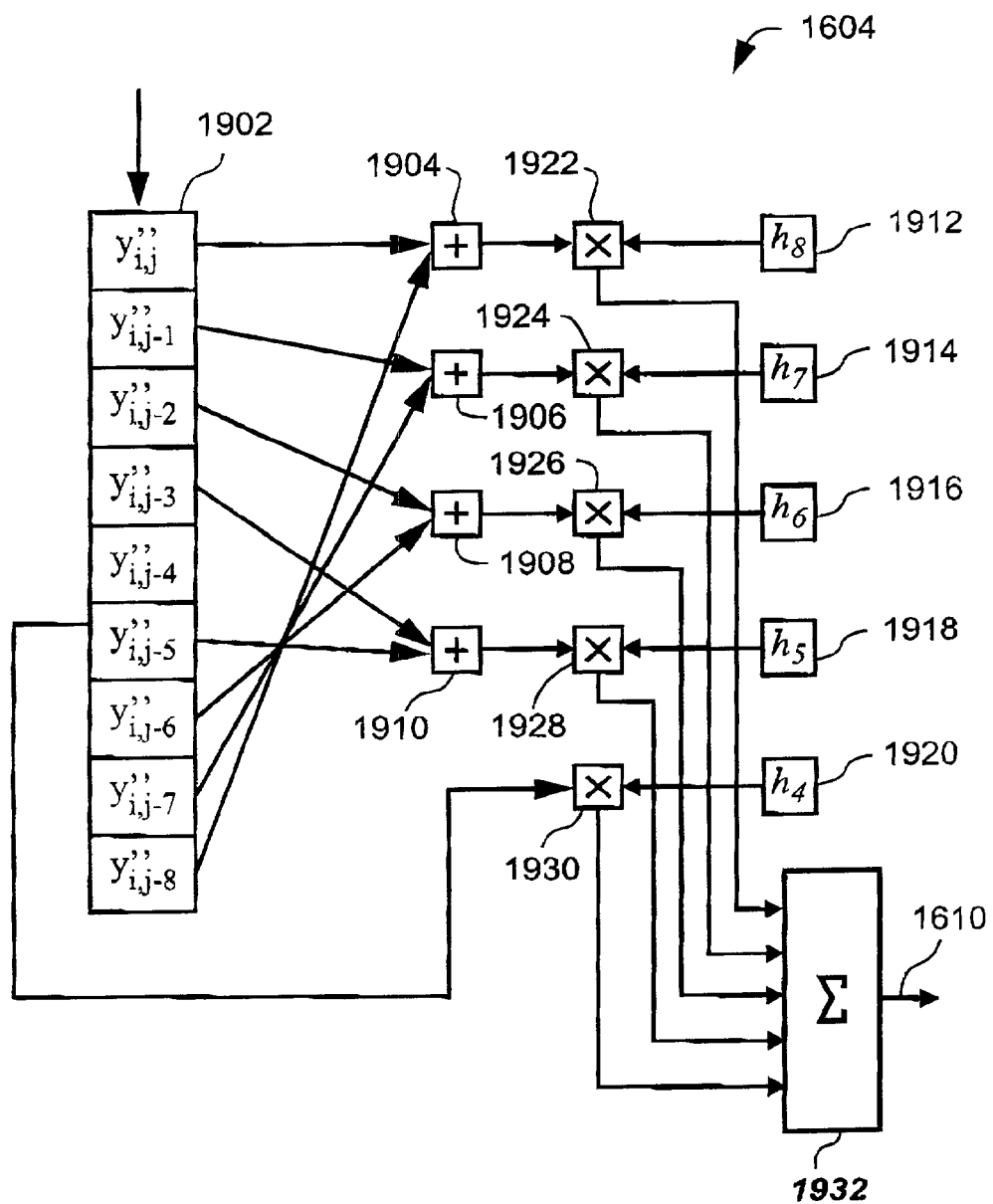
FIG. 16 shows a horizontal filter arrangement which can be used in FIG. 14.

Turning now to FIG. 16, there is shown a block diagram of a sequential convolver suitable for use as the horizontal filter 1604 shown in FIG. 14. The structure of the horizontal filter 1604 is substantially the same as the vertical filter 1602, with the exception of the input arrangement of the filter and the values of the filter coefficients $h_i$. As mentioned previously, the immediate transform coefficients are input into the horizontal filter 1604, one at a time, which acts in a shift register manner. The horizontal filter 1604 comprises a memory array 1902 for receiving the nine immediate transform coefficients { $y''_{ij}$, $y''_{ij-1}$, $y''_{ij-2}$, $y''_{ij-3}$, $y''_{ij-4}$, $y''_{ij-5}$, $y''_{ij-6}$, $y''_{ij-7}$, $y''_{ij-8}$} in a sequential manner. The horizontal filter 1604 further comprises four adders 1904, 1906, 1908, and 1910 for adding together the transform coefficients stored in the memory array 1902. Namely, adder 1904 adds together the transform coefficients $y''_{ij}$ and $y''_{ij-8}$, the adder 1906 adds together the transform coefficients $y''_{ij-1}$ and $y''_{ij-7}$, the adder 1908 adds together the transform coefficients $y''_{ij-2}$ and $y''_{ij-6}$, and the adder 1910 adds together the transform coefficients $y''_{ij-3}$ and $y''_{ij-5}$. The horizontal filter 1604, in addition, comprises five memory stores 1912, 1914, 1916, 1918 and 1920 for storing the filter coefficients $h_8$, $h_7$, $h_6$, $h_5$, and $h_4$. The horizontal filter 1604 also comprises four multipliers 1922, 1924, 1926, and 1928 for multiplying the added transform coefficients output by the adders 1904, 1906, 1908, and 1910 by the filter coefficients $h_8$, $h_7$, $h_6$, and $h_5$ stored in memory stores 1912, 1914, 1916, and 1918 respectively. In addition, the horizontal filter 1604 comprises a further multiplier 1930 for multiplying the centre transform coefficient $y''_{i+4j}$ stored in memory array 1902 by the centre filter coefficient $h_4$ stored in memory 1920. The results of the multipliers 1922, 1924, 1926, 1928, and 1930 are then fed to a summer 1932 which adds the results of the multipliers and feds them to an output channel 1610 of the horizontal filter 1604. In this way, the horizontal filter 1604 outputs an inverse transform coefficient one per clock cycle.

Figure 17:
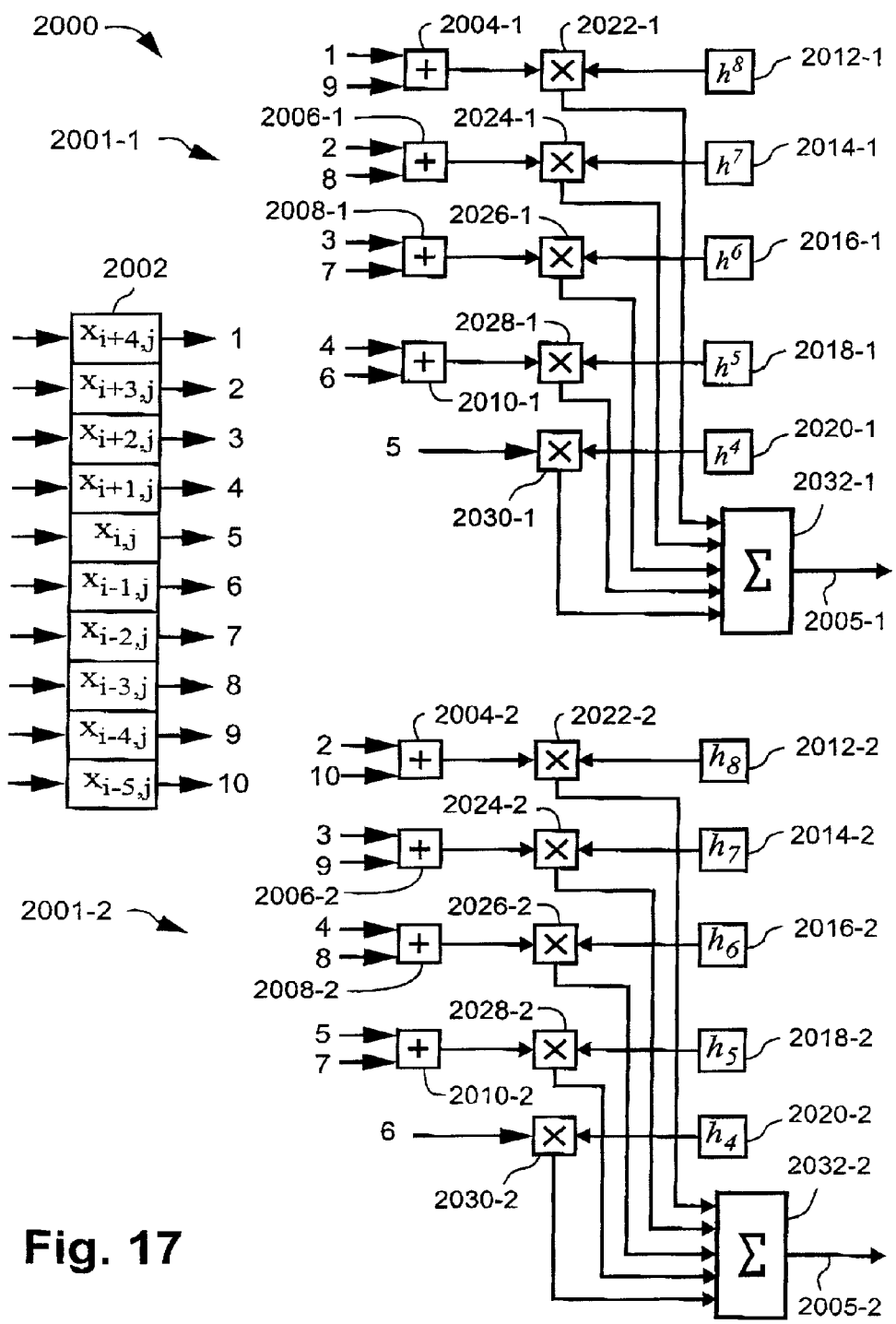
FIG. 17 depicts all IDWT transformer arranged to access and output multiple lines of data.

Turning now to FIG. 17, there is shown an arrangement 2000 of part of an inverse two-dimensional separable DWT transformer which is similar to the arrangement shown in FIG. 14, except that the arrangement 2000 has the advantage of accessing multiple lines of the sub-band and output multiple coefficients simultaneously This advantage is achieved by multiple parallel convolvers (2001-1, 2001-2) and sequential convolvers (2104-1, 2104-2) (see FIG. 18) arranged in parallel. Namely, the arrangement 2000 comprises multiple vertical filters (2001-1, 2001-2 ) with a common memory array 2002 and corresponding multiple horizontal filters (2104-1, 2104-2) in parallel.

For ease of explanation, only two parallel vertical and horizontal filter paths are shown, although the embodiment is not intended to be limited thereto. The arrangement 2000 can comprise many more parallel vertical and horizontal filter paths. Furthermore, the vertical and horizontal filters filter 1602 and 1604 (see FIG. 14) both have nine taps but again it is not intended to be limited thereto.

The arrangement 2000 comprises two vertical filters 2001-1 and 2001-2 having a common memory array 2002. The memory array 2002 has parallel inputs for receiving ten transform coefficients { $x_{i-5j}$, $x_{i-4j}$, $x_{i-3j}$, $x_{i-2j}$, $x_{i-1j}$, $x_{ij}$, $x_{i+1j}$, $x_{i+3j}$, $x_{i+3j}$, $x_{i+4j}$ } of the wavelet transform sub-band as input. The nine transform coefficients {$x_{i-4j}$, $x_{i-3j}$, $x_{i-2j}$, $x_{i-1j}$, $x_{ij}$, $x_{i+1j}$, $x_{i+2j}$, $x_{i+3j}$, $x_{i+4j}$ } are then input to the vertical filter 2001-1 and the nine transform coefficients { $x_{i-5j}$, $x_{i-4j}$, $x_{i-3j}$, $x_{i-2j}$, $x_{i-1j}$, $x_{ij}$, $x_{i+1j}$, $x_{i+2j}$, $x_{i+3j}$ } are then input to the vertical filter 2001-2. Namely, the coefficient $x_{i+4j}$ is input via 1 to adder 2004-1, the coefficient $x_{i+3j}$ is input via 2 to adders 2006-1 and 2004-2, the coefficient $x_{i+2j}$ is input via 3 to adders 2008-1 and 2006-2, and so on. In this way, the vertical filters 2001-1 and 2001-2 simultaneously calculate the intermediate transform coefficients for the locations i,j and i−1j respectively.

The vertical filters 2001-1 and 2001-2 are both substantially the same and only filter 2001-1 will be described in detail. The vertical filter 2001-1 further comprises four adders 2004-1, 2006-1, 2008-1, and 2010-1 for adding together the transform coefficients stored in the memory array 2002. Namely, adder 2004-1 adds together the transform coefficients $x_{i-4j}$ and $x_{i+4j}$, the adder 2006-1 adds together the transform coefficients $x_{i-3j}$ and $x_{i+3j}$, the adder 2008-1 adds together the transform coefficients $x_{i-2j}$ and $x_{i+2j}$, and the adder 2010-1 adds together the transform coefficients $x_{i-1j}$ and $x_{i+1j}$. The vertical filter 2001-1, in addition, comprises five memory stores 2012-1, 2014-1, 2016-1, 2018-1 and 2020-1 for storing the filter coefficients $h_8$, $h_7$, $h_6$, $h_5$, and $h_4$. The vertical filter also comprises four multipliers 2022-1, 2024-1, 2026-1, and 2028-1 for multiplying the added transform coefficients output by the adders 2004-1, 2006-1, 2008-1, and 2010-1 by the filter coefficients $h_8$, $h_7$, $h_6$, and $h_5$ stored in memory stores 2012-1, 2014-1, 2016-1, and 2018-1 respectively. In addition, the vertical filter 2001-1 comprises a further multiplier 2030-1 for multiplying the centre transform coefficient $x_{ij}$ stored in memory array 2002 by the centre filter coefficient $h_4$ stored in memory 2020-1. The results of the multipliers 2022-1, 2024-1, 2026-1, 2028-1, and 2030-1 are then fed to a summer 2032-1 which adds the results of the multipliers and feeds them to an output channel 2005-1 of the vertical filter 2001-1. Thus, the vertical filters 2001-1 and 2001-2 outputs intermediate transform coefficients $y_{ij}$ and $y_{i-1j}$ respectively one per clock cycle.

Figure 18:
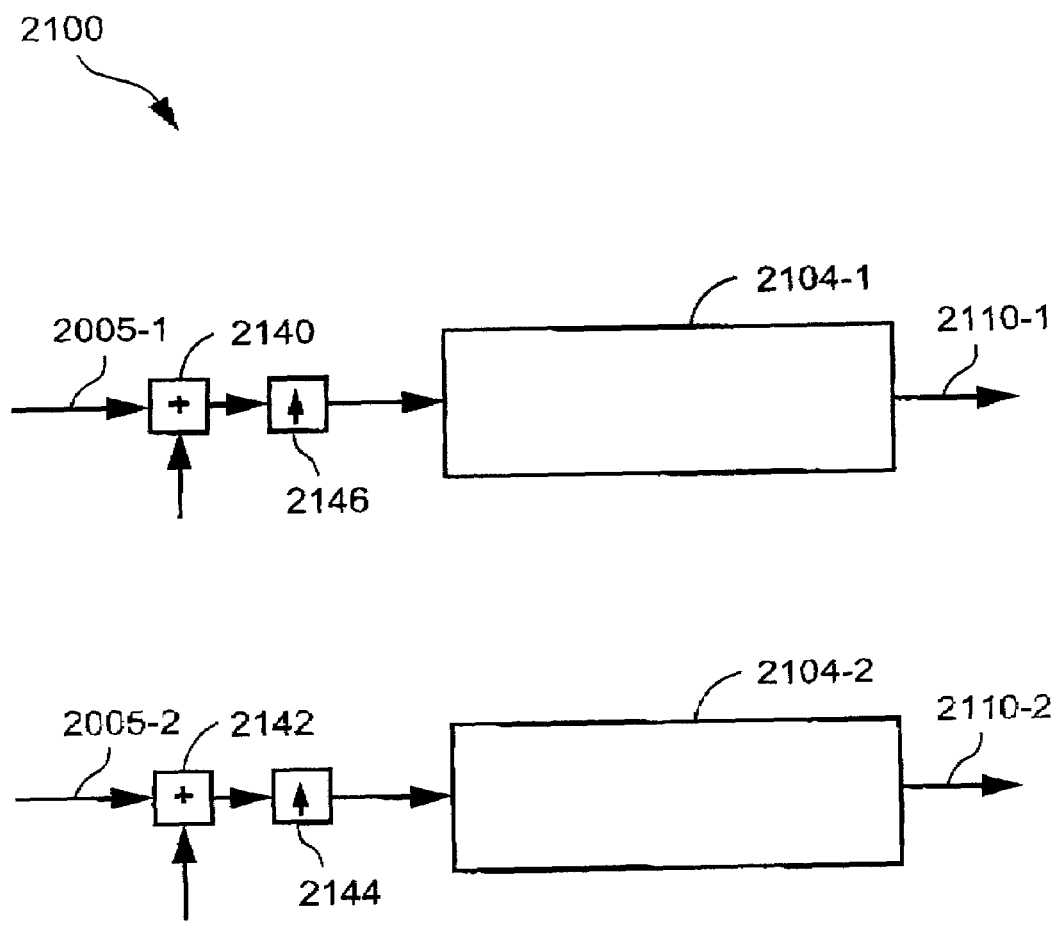
FIG. 18 shows horizontal a filter arrangement suitable for use in FIG. 17.

The vertical filters 2001-1 and 2001-2 are coupled to the horizontal filters 2104-1 and 2104-2 respectively via adders 2140 and 2142 and interpolators 2144 and 2146 (see FIG. 18). The intermediate transform coefficients $y_{ij}$, $y_{i-1j}$ are fed to respective adders 2140 and 2142 in a pipeline manner and added to intermediate transform coefficients $y'_{ij}$ $y'_{i-1j}$ from other vertical line filters (not shown), The added transform coefficients are then interpolated in the horizontal direction (up sampled) by interpolators 2144 and 2146.

The interpolated transform coefficients $y''_{ij}$, $y''_{i-1j}$ are then fed to respective horizontal line filters 2104-1 and 2104-2. The horizontal line filters 2104-1 and 2104-2 each comprise a sequential convolver of the type described with reference to FIG. 16. The horizontal filters 2104-1 and 2104-2 output the inverse transformed image coefficients 2110-1, 2110-2 in a pipeline manner. The arrangement is such that the inverse transform coefficients 2110-1, 2110-02 are calculated two rows at a time in raster order.

A number of different implementations exploiting re-use of hardware modules are now described. This re-use is made possible because of the up-sampling inherent between successive levels of the IDWT. The consequence of this is that computational blocks associated with the final inverse transform level run at the highest speed, with computational blocks associated with previous levels having progressively more "idle time".

Figure 19:
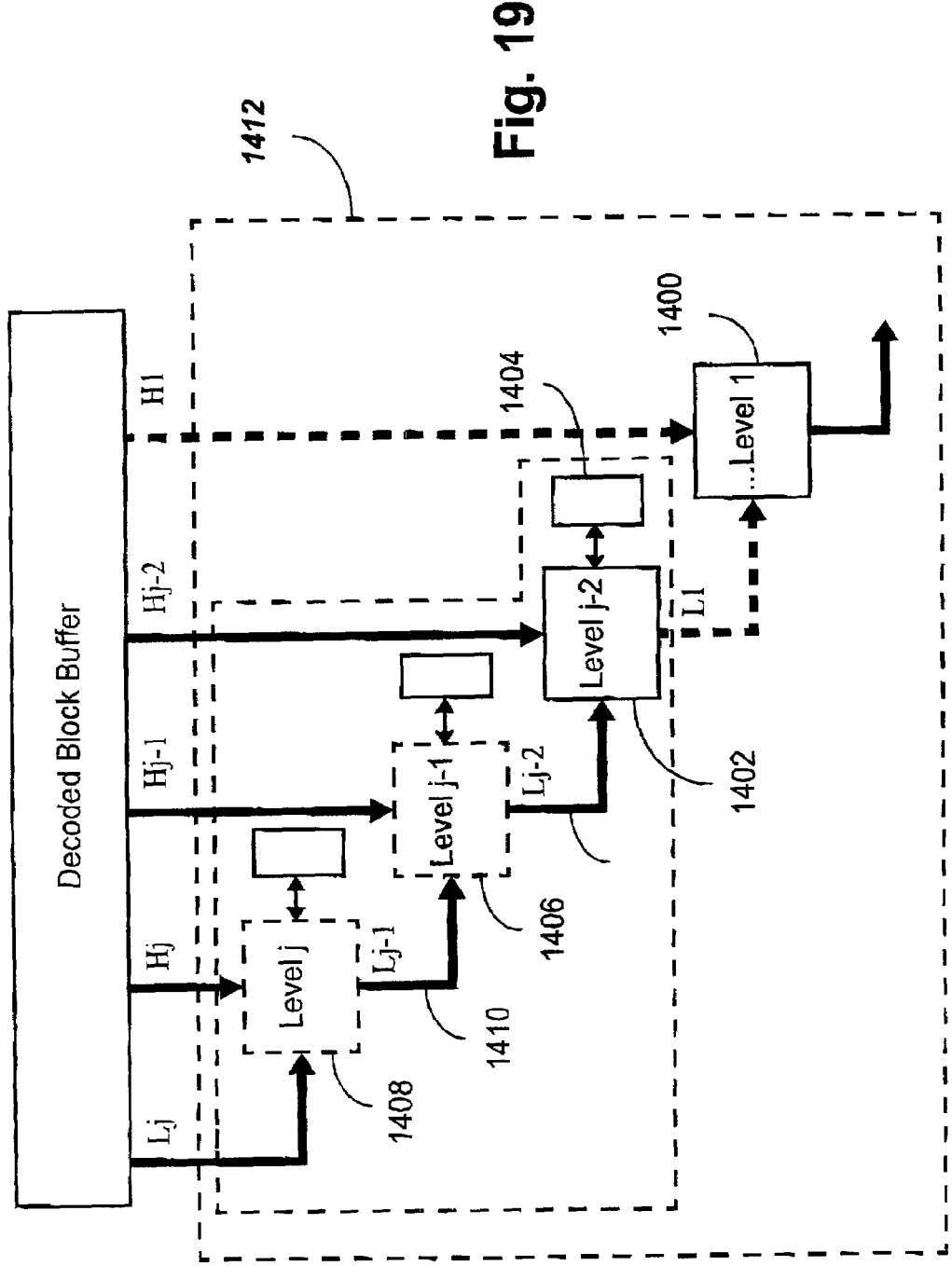
FIG. 19 depicts use of "virtual" computational blocks in relation to FIG. 13.

FIG. 19 makes use of this idle time, the architecture described in relation to FIG. 13 being replicated for each level, with a computation circuit 1408 at level j feeding the LL data 1410 into an identical computational circuit 1406 at level j–1, and so on in a cascade arrangement. Dashed blocks have been used to represent the computational blocks 1408 and 1406 to indicate that they are virtual computational blocks, resulting from time sharing the "real" computational block 1402 at the various levels. The set of computational blocks for all levels 1 through j comprises a computational pipeline.

In order to produce a single output point at a given level j–1, assuming a low pass filter of 9 taps, a minimum 5×5 points are required for each sub-band at the preceeding level j, which are then up-sampled before filtering. To ensure uniformity of implementation across levels, as well as stable filter sizes as the filters are "slid", 8×8 points are defined as being required from each sub-band in the preceeding levels. As illustrated in FIG. 6 for the one-dimensional case, this implies that all 8×8 points from each sub-band must be available from the preceeding level j, before any operations can occur at level j–1. This implies, that in order to fill the pipeline, LL sub-band data must be generated from level j, then for level j–1, and thereafter for every level up to level 1, so that the complete computational pipeline is filled.

With reference to FIG. 13, this process occurs sequentially, as LL data is generated by stepping a column of data eg. 1302 from each of the input sub-bands through the vertical parallel convolvers eg. 1304, which then feed the sequential convolvers eg. 1316 on each cycle, after the requisite summations are performed eg. in adder 1332. Data is clocked into the circuit on each cycle until seven sets of seven points 1324 are generated as output from the serial convolvers eg. 1316 being added in adders 1338. This LL data is generated one column at a time, and the generation of each column signals the computational circuit at the next level to accept this, and also to retrieve the LH, HL and HH columns associated therewith, to perform a vertical parallel convolution step. Once a level has generated seven columns of output LL data 1324, further columns of input data for each of the sub-bands is only clocked into the parallel convolvers, eg. 1304 when the next level requires an additional column of data. After the pipeline is filled, each level operates at half the rate of the next level, ie. level j operates at half the rate of level j–1.

At level 1, the computational circuit is capable of producing one column of output data, eg. 1324, on each clock cycle. However, for every column of sub-band data that is input into this level, two columns are generated at the output, due to the up-sampling of input data within the convolves. Therefore, level 1 requires input data in the form of columns from the LL, LH, HL and HH sub-bands at half the rate that it produces output. Again, as described in relation to the one dimensional case, since this occurs at all levels, it is apparent that one set of four vertical parallel convolvers can satisfy the requirements of all levels beyond level 1, ie. can satisfy the requirements of level 2 through to level j.

Because no state information is required in the vertical parallel convolvers eg. 1304, one set of four vertical parallel convolvers can be shared amongst levels 2 to j. A multiplexer at the input of each convolver feeds sub-band data from the required level at the appropriate time.

Figure 20:
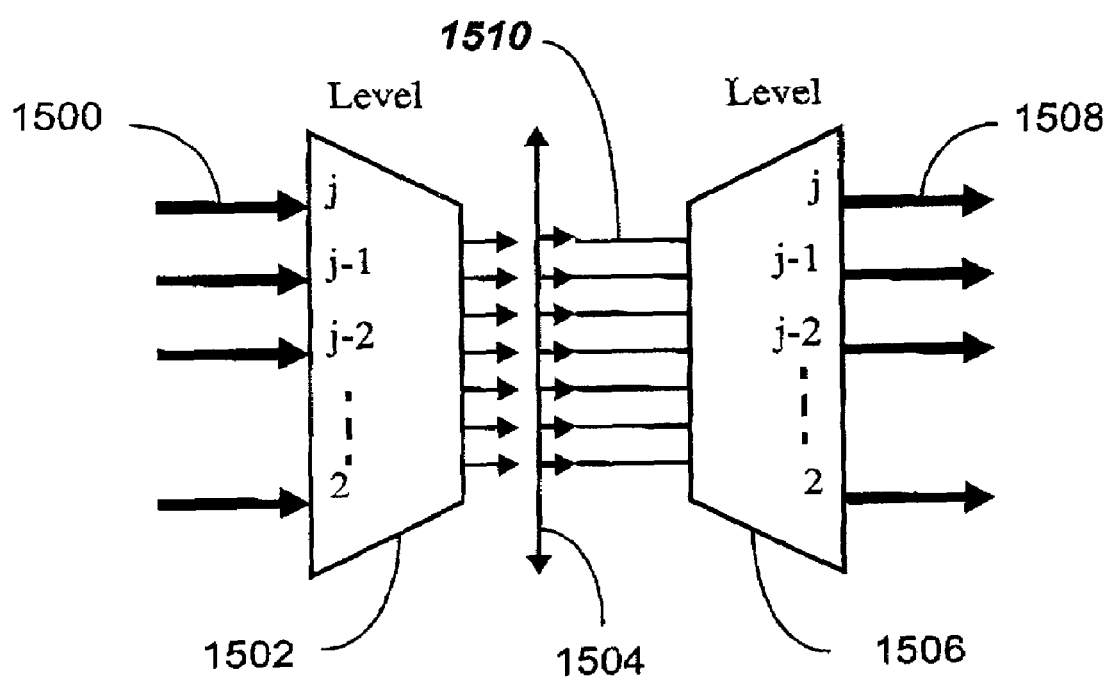
FIG. 20 illustrates a multiplexer used to form the virtual blocks in FIG. 19.

This is illustrated in FIG. 20, where sub-band data 1500 which is seven points wide is fed into a multiplexer 1502, thereafter being selectively fed to a (shared) vertical convolver 1504. This convolver 1504 produces seven outputs points 1510 which are directed to an output multiplexer 1506, which in turn directs the sub-band data 1508 to the appropriate horizontal convolver. Output from the parallel convolvers are fed back to the level that is supplying the input at the current time.

The same approach can be applied to the serial convolvers eg. 1316 associated 0 with each level. It is noted however that the serial convolvers contain state information which must be preserved, and therefore if this approach is adopted, a context store eg 1404 (see FIG. 19) is provided in relation to the horizontal convolver, which stores state information for each serial convolver eg. 1316 for a particular level, while the serial convolver is being used at another level.

Figure 21:
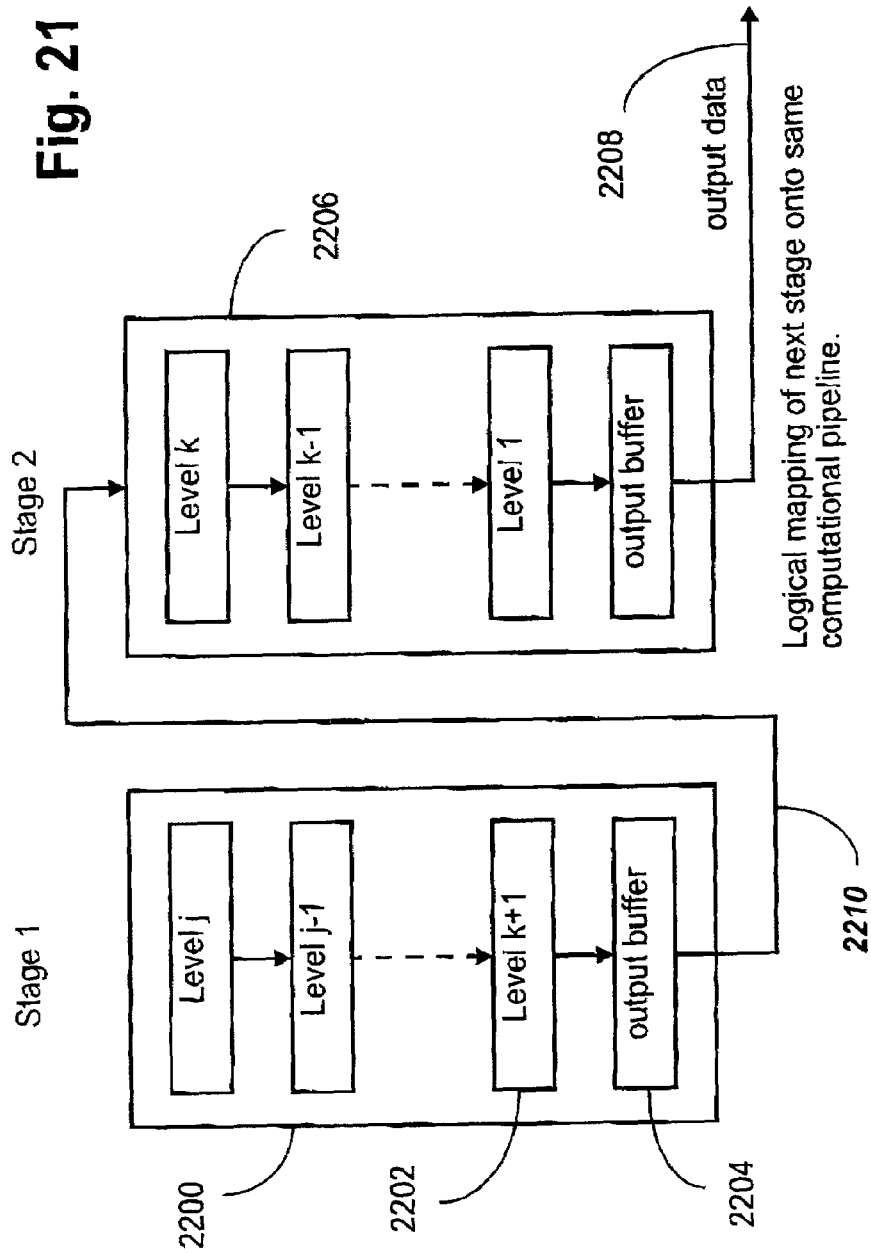
FIG. 21 depicts a multi-stage pipeline which can be applied in relation to FIG. 13.
Figure 22:
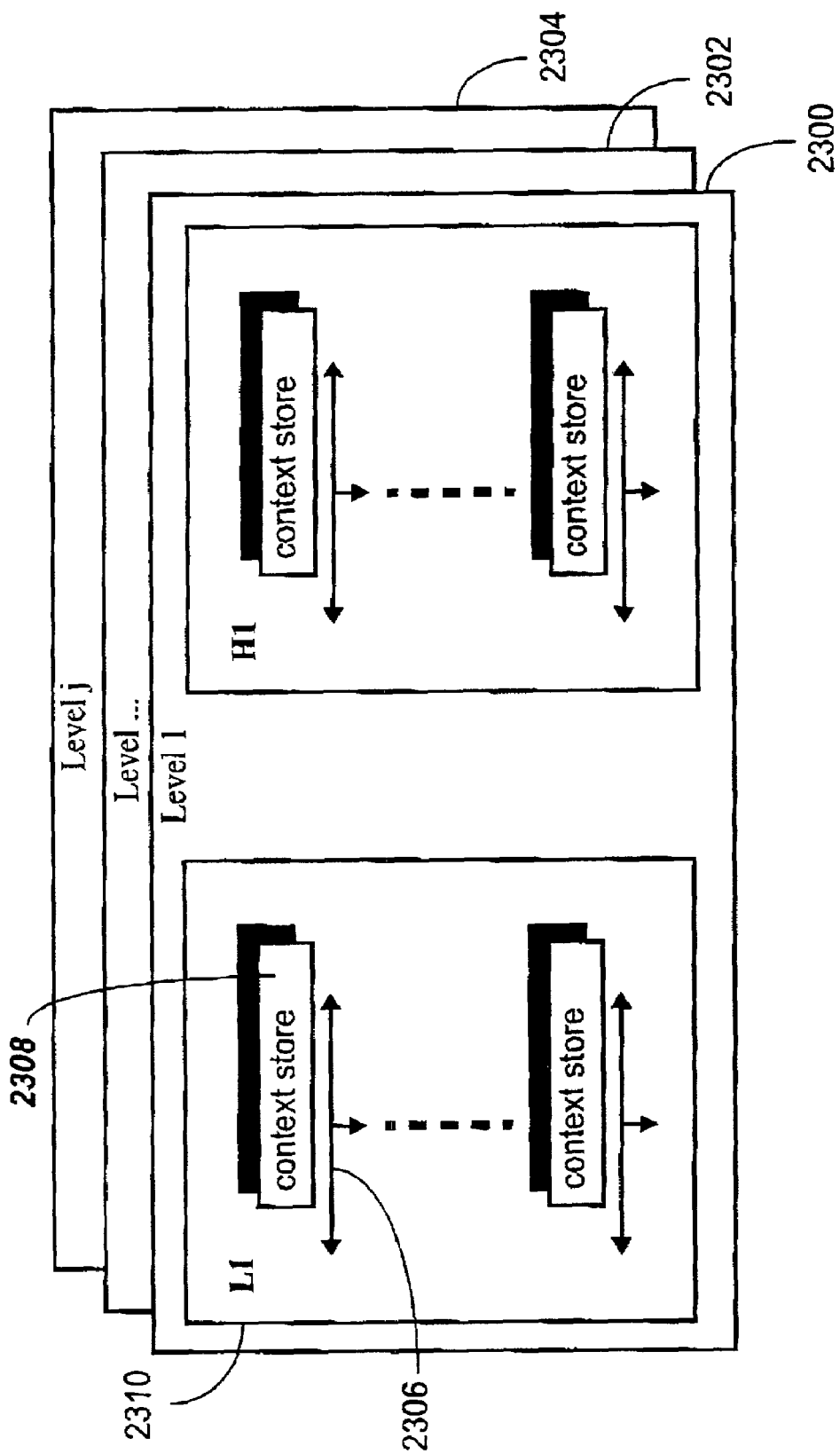
FIG. 22 illustrates a context store for use in the arrangement of FIG. 21.

The storage of horizontal sequential convolver state further enables a multi-stage implementation of the computational pipeline. This technique is useful if it is determined that hardware cost is a limiting factor, and yet that further layers of tranformation are required We recall in relation to FIG. 19 how a real computational block 1402 is shared to form a virtual computational block eg 1406 during the idle time associated with level j–2. The multi-stage embodiment takes this use of virtual computational blocks one step further, as shown in FIG. 21. The storage of context to enable multiple stages of computational pipeline may be effected by a register store for each sequential convolver in the computational pipeline. This is shown in the FIG. 22, in which a context store 2308 is associated with each horizontal convolver 2306. One such store 2308 is requested per horizontal convolver 2306 per pipeline stage. Thus, if a two stage pipeline is required, two stores 2308 are required for each horizontal convolver 2306. This enables hardware associated with level 1 ie 2300 to be logically mapped to other levels 2302, 2304 at the cost of additional memory for the context stores. This arrangement provides a context store for the complete stage of the computational pipeline. The number of stages which can be supported is determined by the number of context stores 2308 associated with each and every sequential convolver 2306 in the design.

Figure 23:
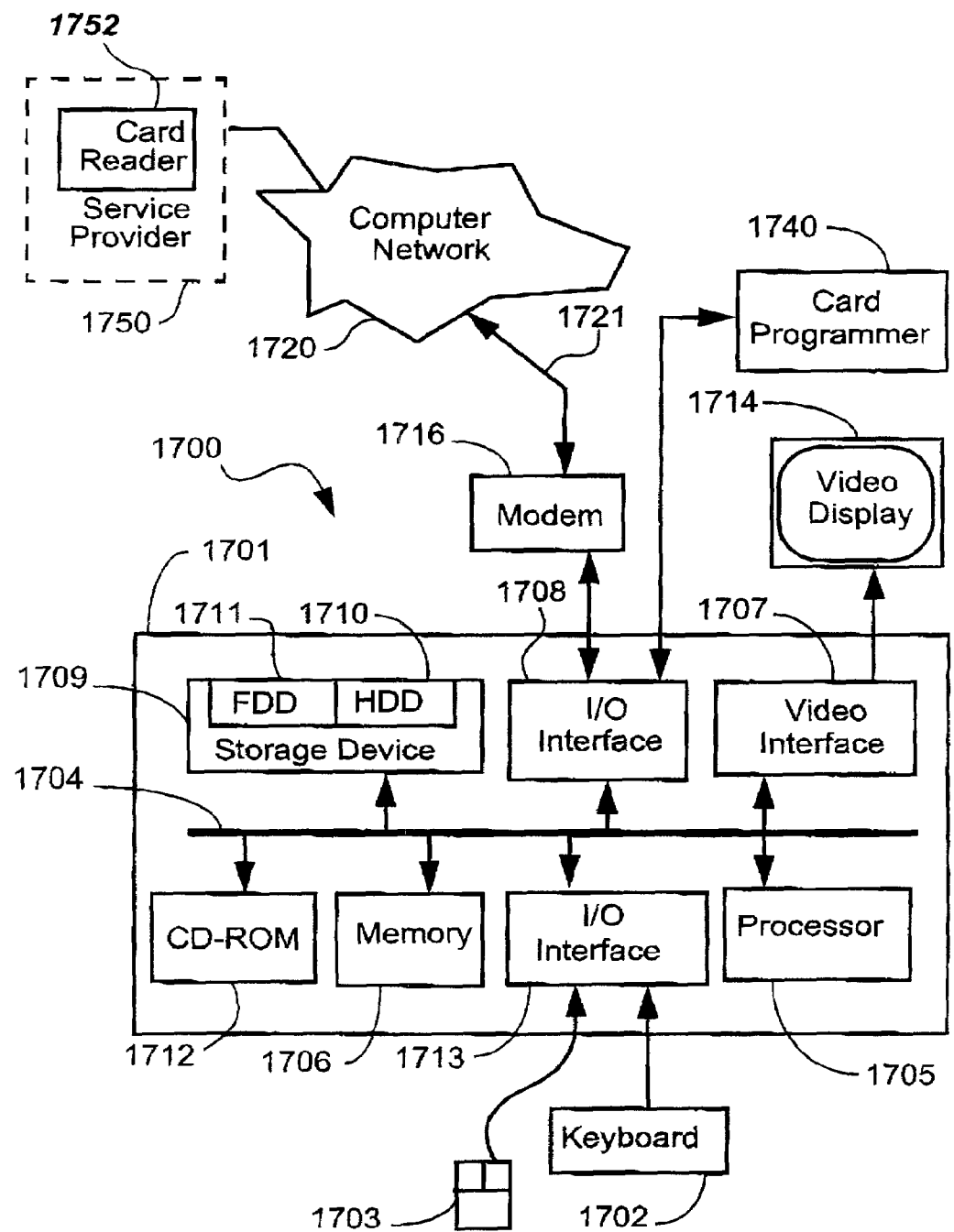
FIG. 23 is a schematic block diagram of a general purpose computer upon which the preferred embodiment of the present invention can be practiced.

The method of the IDWT can be practiced using a conventional general-purpose computer system 1700, such as that shown in FIG. 23 wherein the process of the IDWT can be implemented as software, such as an application program executing within the computer system 1700. In particular, the steps of the method of the IDWT are effected by instructions in the software that are carried out by the computer. The software can be divided into two separate parts; one part for carrying out the IDWT methods; and another part to manage the user interface between the latter and the user. The software can be stored in a computer readable medium, including the storage devices described below, for example, The software is loaded into the computer from the computer readable medium, and then executed by the computer. A computer readable medium having such software or computer program recorded on it is a computer program product The use of the computer program product in the computer preferably effects an advantageous apparatus for performing an IDWT in accordance with described arrangements.

The computer system 1700 comprises a computer module 1701, input devices such as a keyboard 1702 and mouse 1703, output devices including a printer 1715 and a display device 1714. A Modulator-Demodulator (Modem) transceiver device 1716 is used by the computer module 1701 for communicating to and from a communications network 1720, for example connectable via a telephone line 1721 or other functional medium. The modem 1716 can be used to obtain access to the Internet, and other network systems, such as a Local Area Network (LAN) or a Wide Area Network (WAN).

The computer module 1701 typically includes at least one processor unit 1705, a memory unit 1706, for example formed from semiconductor random access memory (RAM) and read only memory (ROM), input/output (I/O) interfaces including a video interface 1707, and an I/O interface 1713 for the keyboard 1702 and mouse 1703 and optionally a joystick (not illustrated), and an interface 1708 for the modem 1716. A storage device 1709 is provided and typically includes a hard disk drive 1710 and a floppy disk drive 1711. A magnetic tape drive (not illustrated) may also be used. A CD-ROM drive 1712 is typically provided as a non-volatile source of data. The components 1705 to 1713 of the computer module 1701, typically communicate via an interconnected bus 1704 and in a manner which results in a conventional mode of operation of the computer system 1700 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 1710 and is read and controlled in its execution by the processor 1705. Intermediate storage of the program a-d any data fetched from the network 1720 may be accomplished using the semiconductor memory 1706, possibly in concert with the hard disk drive 1710. In some instances, the application program may be supplied to the user encoded on a CD-ROM or floppy disk and read via the corresponding drive 1712 or 1711, or alternatively may be read by the user from the network 1720 via the modem device 1716. Still further, the software can also be loaded into the computer system 1700 from other computer readable medium including magnetic tape, a ROM or integrated circuit, a magneto-optical disk, a radio or infra-red transmission channel between the computer module 1701 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of the IDWT can alternatively be implemented in dedicated hardware such as one or more integrated circuits performing the functions or sub functions of the IDWT. Such dedicated hardware may include digital signal processors, or one or more microprocessors and associated memories.

INDUSTRIAL APPLICABILITY

It is apparent from the above that the embodiments of the invention are applicable to the computer and data processing industries.

The foregoing describes only some embodiments of the present invention, and modifications and/or changes can be made thereto without departing from the scope and spirit of the invention, the embodiments being illustrative and not restrictive.

The invention claimed is:

1. A method for performing an Inverse Discrete Wavelet Transform (IDWT) comprising, for a first sub-band level and a second sub-band level in an N level Discrete Wavelet Transform, the steps of:
   (i) processing, as soon as a first computation block is filled with sets of data points from corresponding sub-bands of the first sub-band level, those sets of data points from corresponding sub-bands of the first sub-band level, to form a set of processed data points in a sub-band of the second sub-band level; and
   (ii) processing, as soon as a second computation block is filled with the set of processed data points in the sub-band of the second sub-band level in conjunction with at least one set of data points from a corresponding at least one sub-band of the second sub-band level, that set of processed data points in the sub-band of the second sub-band level in conjunction with the at least one set of data points from said corresponding at least one sub-band of the second sub-band level, to form a set of processed data points in a sub-band of a subsequent sub-band level,
   wherein each set of data points is smaller than the number of data points in a corresponding sub-band level.

2. A method according to claim 1,
   wherein the processing in the steps (i) and (ii) is performed using respective sets of first filters and second filters, the first filters and the second filters being fixed and of equal width,
   wherein the second filters are effected by one set of dedicated filters in regard to processing of sub-band level 1, and
   wherein the first filters and second filters are effected by time sharing one set of filters among all remaining sub-band levels, that one set of filters being applied to a single sub-band level of the remaining sub-band levels at a time.

3. A method according to claim 2, wherein the time sharing is performed using a time multiplexer which multiplexes data from the remaining sub-band levels to the time shared set of filters.

4. A method according to claim 2, wherein data associated with sub-bands of one of the remaining sub-band levels is stored while the set of time shared filters is being applied to sub-bands of another one of the remaining sub-band levels.

5. A method according to any one of claims 1 to 4, wherein the first filters and the second filters are N dimensional separable IDWT transformers.

6. A method for performing an Inverse Discrete Wavelet Transform IDWT in relation to a 2-dimensional N level Discrete Wavelet Transform, said method comprising the steps of:
   (i) processing, as soon as a first computation block is filled with sets of M×M data points from corresponding sub-bands of a first sub-band level, those sets of M×M data points from corresponding sub-bands of a first sub-band level, to form a set of M×M processed data points in a sub-band of a second sub-band level; and
   (ii) processing, as soon as a second computation block is filled with the set of M×M processed data points in the sub-band of the second sub-band level in conjunction with sets of M×M data points from corresponding sub-bands of the second sub-band level, the set of M×M processed data points in the sub-band of the second sub-band level in conjunction with sets of M×M data points from corresponding sub-bands of the second sub-band level to form a set of M×M processed data points in a sub-band of a subsequent sub-band level, wherein each said set of M×M data points is smaller than the number of data points in a corresponding sub-band level.

7. An apparatus for performing an Inverse Discrete Wavelet Transform IDWT comprising, for a first sub-band level and a second sub-band level in an N level Discrete Wavelet Transform:

(i) means for processing, as soon as a first computation block is filled with sets of data points from corresponding sub-bands of the first sub-band level, those sets of data points from corresponding sub-bands of the first sub-band level, to form a set of processed data points in a sub-band of the second sub-band level; and (ii) means for processing, as soon as second computational block is filled with the set of processed data points in the sub-band of the second sub-band level in conjunction with at least one set of data points from a corresponding at least one sub-band of the second sub-band level, the set of processed data points in the sub-band of the second sub-band level in conjunction with at least one set of data points from a corresponding at least one sub-band of the second sub-band level, to form a set of processed data points in a sub-band of a subsequent sub-band level, wherein each said set of data points is smaller than the number of data points in a corresponding sub-band level.

8. An apparatus according to claim 7, wherein;

said means for processing in the paragraphs (i) and (ii) comprise respective first filters and second filters, said first filters and second filters being fixed and of equal width, and wherein said apparatus further comprises:

one set of filters for time sharing;

one set of dedicated filters for effecting, in regard to processing of sub-band level 1, said second filters; and means for time sharing, among all remaining sub-band levels, said one set of filters to effect said first filters and said second filters, said one set of filters being applied to a single sub-band level of the remaining sub-band levels at a time.

9. An apparatus according to claim 8, further comprising:

a time multiplexer which multiplexes data from the remaining sub-band levels to the time shared set of filters.

10. An apparatus according to claim 8, further comprising:

storage means for storing data associated with sub-bands of one of the remaining sub-band levels while the set of time shared filters is being applied to sub-bands of another one of the remaining sub-band levels.

11. An apparatus according to any one of claims 7 to 10 wherein said first filters and said second filters are N dimensional separable Inverse Discrete Wavelet Transform IDWT transformers.

12. An apparatus for performing an Inverse Discrete Wavelet Transform IDWT in relation to a 2-dimensional N level Discrete Wavelet Transform, said apparatus comprising:

(i) means for processing, as soon as a first computational block is filled with sets of M×M data points from corresponding sub-bands of a first sub-band level, those sets of M×M data points from corresponding sub-bands of a first sub-band level, to form a set of M×M processed data points in a sub-band of a second sub-band level; and (ii) means for processing, as soon as a second computational block is filled with the set of M×M processed data points in the sub-band of the second sub-band level in conjunction with sets of M×M data points from corresponding sub-bands of the second sub-band level, the set of M×M processed data points in the sub-band of the second sub-band level in conjunction with sets of M×M data points from corresponding sub-bands of the second sub-band level, to form a set of M×M processed data points in a sub-band of a subsequent sub-band level, wherein each said set of M×M data points is smaller than the number of data points in a corresponding sub-band level.

13. A computer readable memory medium storing a program for performing an Inverse Discrete Wavelet Transform IDWT, said program comprising in relation to a first sub-band level and an N level Discrete Wavelet Transform:

(i) code for processing, as soon as a first computational block is filled with sets of data points from corresponding sub-bands of the first sub-band level, those sets of data points from corresponding sub-bands of the first sub-band level, to form a set of processed data points in a sub-band of the second sub-band level; and (ii) code for processing, as soon as a second computational block is filled with the set of processed data points in the sub-band of the second sub-band level in conjunction with at least one set of data points from a corresponding at least one sub-band of the second sub-band level, the set of processed data points in the sub-band of the second sub-band level in conjunction with at least one set of data points from a corresponding at least one sub-band of the second band level, to form a set of processed data points in a sub-band of a subsequent sub-band level, wherein each said set of data points is smaller than the number of data points in a corresponding sub-band level.

14. A computer readable memory medium storing a program for performing an Inverse Discrete Wavelet Transform IDWT in relation to a 2-dimensional N level Discrete Wavelet Transform, said program comprising:

(i) code for processing, as soon as first computational block is filled with sets of M×M data points from corresponding sub-bands of a first sub-band level, those sets of M×M data points from corresponding sub-bands of a first sub-band level, to form a set of M×M processed data points in a sub-band of a second sub-band level; and (ii) code for processing, as soon as a second computational block is filled with the set of M×M processed data points in the sub-band of the second sub-band level in conjunction with sets of M×M data points from corresponding sub-bands of the second sub-band level, the set of M×M processed data points in the sub-band of the second sub-band level in conjunction with sets of M×M data points from corresponding sub-bands of the second sub-band level, to form a set of M×M processed data points in a sub-band of a subsequent sub-band level, wherein each said set of M×M data point is smaller than the number of data points in a corresponding sub-band level.

15. A method according to claim 1, wherein the set of processed data points in the sub-band of the second sub-band level are formed before all data points in the sub-bands of the first sub-band level are processed.

16. A method according to claim 1, wherein said step (ii) commences before all data points in the sub-bands of the first sub-band level are processed.

17. A method according to claim 6, wherein the set of processed M×M data points in the sub-band of the second sub-band level are formed before all data points in the sub-bands of the first sub-band level are processed.

18. A method according to claim 6, wherein said step (ii) commences before all data points in the sub-bands of the first sub-band level are processed.

* * * * *

UNITED STATES PATENT AND TRADEMARK OFFICE
CERTIFICATE OF CORRECTION

PATENT NO. : 7,031,404 B2
APPLICATION NO. : 09/730558
DATED : April 18, 2006
INVENTOR(S) : Timothy J. Lindquist It is certified that error appears in the above-identified patent and that said Letters Patent is hereby corrected as shown below:

COLUMN 1

Line 16, "coder" should read --coder.--; and
    Line 55, "In" should read --in--.

COLUMN 3

Line 7, "dimensions," should read --dimensions;--;
    Line 21, "subband" should read --sub-band--;
    Line 32, "subbands" should read --sub-bands--;
    Line 54, "FIG. 1," should read --FIG. 1;--; and
    Line 66, "two" should read --two- --.

COLUMN 4

Line 13, "all" should read --an--;
    Line 15, "horizontal a" should read --a horizontal--;
    Line 22, "FIG. 13:" should read --FIG. 13;--;
    Line 40, "dimensions" should read --dimensions.--; and
    Line 58, "ie." should read --i.e.,--.

COLUMN 5

Line 10, "(ie" (both occurrences) should read --(i.e.,--;
    Line 11, "(ie" should read --(i.e.,--;
    Line 12, "(ie" (both occurrences) should read --(i.e.,--;
    Line 18, "memory" should read --memory.--;
    Line 36, "(ie." should read --(i.e.,--;
    Line 42, "(ie." should read --(i.e.,--;
    Line 50, "ie." should read --i.e.,--;
    Line 54, "Bach" should read --Each--;
    Line 56, "respectively" should read --respectively.--; and
    Line 66, "downsampling" should read --down-sampling--.

COLUMN 6

Line 19, "ie," should read --i.e.,--
    Line 36, "ie." should read --i.e.,--;
    Line 41, "eg." should read --e.g.,--; and
    Line 65, "ie." should read --i.e.,--.

UNITED STATES PATENT AND TRADEMARK OFFICE
CERTIFICATE OF CORRECTION

PATENT NO.       : 7,031,404 B2
APPLICATION NO.  : 09/730558
DATED            : April 18, 2006
INVENTOR(S)      : Timothy J. Lindquist It is certified that error appears in the above-identified patent and that said Letters Patent is hereby corrected as shown below:

COLUMN 7

Line 20, "ie" should read --i.e.,--;
    Line 25, "implementation" should read --implementation.--;
    Line 31, "ie" should read --i.e.,--;
    Line 38, "upsampled" should read --up-sampled--; and
    Line 47, "described," should read --described.--.

COLUMN 8

Line 19, "(ie." should read --(i.e.,--;
    Line 20, "(ie." should read --(i.e.,--
    Line 34, "eg." should read --e.g.,--; and
    Line 40, "ie." should read --i.e.,--.

COLUMN 9

Line 5, "eg." should read --e.g.,--;
    Line 14, "sots" should read --sets--;
    Line 35, "(ie." should read --(i.e.,--;
    Line 36, "depicted" should read --depicted,--;
    Line 39, "eg." should read --e.g.,--;
    Line 42, "eg." should read --e.g.,--;
    Line 57, "a" should read --an--; and
    Line 64, "level 0" should read --level 0.--.

COLUMN 10

Line 4, "eg." should read --e.g.,--;
    Line 5, "eg." should read --e.g.,--;
    Line 6, "eg." should read --e.g.,--;
    Line 8, "(eg" should read --(e.g.,--; and "witch" should read --which--;
    Line 12, "upconversion" should read --up-conversion--;
    Line 15, "eg." should read --e.g.,--;
    Line 17, "(ie." should read --(i.e.,--;
    Line 22, "ie." should read --i.e.,--;
    Line 28, "eg." should read --e.g.,--;
    Line 34, "eg." should read --e.g.,--;
    Line 35, "eg." should read --e.g.,--;
    Line 40, "(ie." should read --(i.e.,--;
    Line 41, "eg." should read --e.g.,--;

UNITED STATES PATENT AND TRADEMARK OFFICE
CERTIFICATE OF CORRECTION

PATENT NO. : 7,031,404 B2
APPLICATION NO. : 09/730558
DATED : April 18, 2006
INVENTOR(S) : Timothy J. Lindquist It is certified that error appears in the above-identified patent and that said Letters Patent is hereby corrected as shown below:

COLUMN 10 (cont'd)

Line 46, "e.g." should read --e.g.,--;
Line 55, "In" should read --in--; and
Line 57, "eg." should read --e.g.,--.

COLUMN 11

Line 25, "$y_{ij-1}$." should read --$y_{ij+1}$.--
Line 47, "$y^1_{ij-1}$" should read --$y^1_{ij+1}$--;
Line 50, "(up sampled)" should read --(up-sampled)--; and
Line 61, "$y^{11}_{ij-8}$" should read --$y^{11}_{iJ-8}$}.--.

COLUMN 12

Line 10, "sub-band-" should read --sub-band.--
Line 15, "zero" should read --zero.--;
Line 45, "respectively" should read --respectively.--; and
Line 51, "feds" should read --feeds--.

COLUMN 13

Line 12, "re-arrangement" should read --rearrangement--;
Line 50, "feds" should read --feeds--; and
Line 59, "simultaneously" should read --simultaneously--.

COLUMN 14

Line 11, "$x_{i-3j}$," should read --$x_{i-3j}$,--;
Line 58, "shown)," should read --shown).--; and
Line 60, "(up sampled)" should read --(up-sampled)--.

COLUMN 15

Line 38, "eg." should read --e.g.,--;
Line 39, "eg." should read --e.g.,--;
Line 40, "eg." should read --e.g.,--;
Line 41, "eg." should read --e.g.,--;
Line 44, "eg." should read --e.g.,--;
Line 52, "eg." should read --e.g.,--;
Line 54, "ie." should read --i.e.,--;

UNITED STATES PATENT AND TRADEMARK OFFICE
CERTIFICATE OF CORRECTION

| | |
|---|---|
| PATENT NO. | : 7,031,404 B2 |
| APPLICATION NO. | : 09/730558 |
| DATED | : April 18, 2006 |
| INVENTOR(S) | : Timothy J. Lindquist |

It is certified that error appears in the above-identified patent and that said Letters Patent is hereby corrected as shown below:

COLUMN 15 (cont'd)

Line 57, "eg." should read --e.g.,--;
    Line 60, "convolves." should read --convolvers.--;
    Line 63, "one" should read --one- --; and
    Line 66, "ie." should read --i.e.,--.

COLUMN 16

Line 2, "eg." should read --e.g.,--;
    Line 9, "outputs" should read --output--;
    Line 16, "eg." should read --e.g.,--;
    Line 19, "eg" should read --e.g.,--;
    Line 21, "eg." should read --e.g.,--;
    Line 27, "required" should read --required.--;
    Line 29, "eg" should read --e.g.,--;
    Line 38, "two" should read --two- --;
    Line 41, "ie" should read --i.e.,--;
    Line 60, "example," should read --example.--; and
    Line 64, "product" should read --product.--.

COLUMN 17

Line 29, "IBM-PC'S" should read --IBM-PCs--;
    Line 34, "a-d" should read --and--; and
    Line 55, "sub functions" should read --sub-functions--.

COLUMN 19

Line 33, "wherein;" should read --wherein,--.

COLUMN 21

Line 1, "point" should read --points--; and
    Line 6, "are" should read --is--.

UNITED STATES PATENT AND TRADEMARK OFFICE
CERTIFICATE OF CORRECTION

PATENT NO.         : 7,031,404 B2
APPLICATION NO.    : 09/730558
DATED              : April 18, 2006
INVENTOR(S)        : Timothy J. Lindquist It is certified that error appears in the above-identified patent and that said Letters Patent is hereby corrected as shown below:

<u>COLUMN 22</u>

Line 3, "are" should read --is--.

Signed and Sealed this

Sixteenth Day of January, 2007

JON W. DUDAS
*Director of the United States Patent and Trademark Office*